(12) United States Patent
Shan et al.

(10) Patent No.: US 11,076,318 B2
(45) Date of Patent: Jul. 27, 2021

(54) VEHICLE-TO-EVERYTHING (V2X) COMMUNICATION AUTHORIZATION IN FIFTH GENERATION (5G) SYSTEMS

(71) Applicant: Apple Inc., Cupertino, CA (US)

(72) Inventors: Changhong Shan, Portland, OR (US); Meghashree Dattatri Kedalagudde, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/446,337

(22) Filed: Jun. 19, 2019

(65) Prior Publication Data
US 2019/0306754 A1 Oct. 3, 2019

Related U.S. Application Data

(60) Provisional application No. 62/687,702, filed on Jun. 20, 2018.

(51) Int. Cl.
*H04L 12/28* (2006.01)
*H04W 28/22* (2009.01)
(Continued)

(52) U.S. Cl.
CPC ......... *H04W 28/22* (2013.01); *H04L 65/1006* (2013.01); *H04W 4/40* (2018.02);
(Continued)

(58) Field of Classification Search
CPC ..... H04W 4/40; H04W 8/04; H04W 36/0016; H04W 4/46; H04W 4/70; H04W 8/06; H04W 48/16
(Continued)

(56) References Cited

U.S. PATENT DOCUMENTS 10,694,427 B2 * 6/2020 Shan ................. H04W 4/46
2016/0302248 A1 * 10/2016 Yi .................... H04W 4/023
(Continued)

FOREIGN PATENT DOCUMENTS

KR 10-2018-0039902 * 4/2018
KR 10-2018-0057774 * 5/2018

OTHER PUBLICATIONS

3GPP, "Technical Specification Group Services and System Aspects; Architecture enhancements for V2X services (Release 15)," 3GPP TS 23.285 V15.1.0 (Jun. 2018), 5G, 36 pages.
3GPP, "Technical Specification Group Services and System Aspects; General Packet Radio Service (GPRS) enhancements for Evolved Universal Terrestrial Radio Access Network (E-UTRAN) access (Release 15)," 3GPP TS 23.401 V15.4.0 (Jun. 2018), 5G, 410 pages.
3GPP, "Technical Specification Group Services and System Aspects; Procedures for the 5G System; Stage 2 (Release 15)," 3GPP TS 23.502 V15.2.0 (Jun. 2018), 5G, 308 pages.
(Continued)

*Primary Examiner* — John Pezzlo
(74) *Attorney, Agent, or Firm* — Sterne, Kessler, Goldstein & Fox P.L.L.C.

(57) ABSTRACT

One or more techniques of authorizing vehicle-to-everything (V2X) in a wireless network are set forth herein. In one example, during an initial registration procedure or an attach procedure, a UE includes its fifth generation (5G) V2X capability in a Non Access Stratum (NAS) message to a Mobility Management Entity (MME) or an Access and Mobility Management Function (AMF). The MME or the AMF stores this information and determines whether the UE is capable of or authorized to use V2X communication subscription information received from a Home Subscriber Server (HSS) or a Unified Data Management (UDM). If the UE is authorized, the MME or the AMF includes the V2X services authorized in a message from the MME or the AMF to an Evolved Universal Mobile Telecommunications System Terrestrial Radio Access Network (E-UTRAN) or a Next Generation Radio Access Network (NG RAN).

24 Claims, 24 Drawing Sheets

200

Receive and process a first message from a UE to determine that the UE is capable of and/or authorized to support V2X communication over the PC5 interface
201

↓

Transmit a second message to an E-UTRAN indicating that the UE is capable of and/or authorized to V2X communication over a PC5 reference point with authorized RAT technology
203

(51) Int. Cl.
  *H04W 8/04*  (2009.01)
  *H04L 29/06*  (2006.01)
  *H04W 8/06*  (2009.01)
  *H04W 4/40*  (2018.01)
  *H04W 8/18*  (2009.01)
  *H04J 1/16*  (2006.01)

(52) U.S. Cl.
  CPC .............. *H04W 8/04* (2013.01); *H04W 8/06* (2013.01); *H04W 8/186* (2013.01)

(58) Field of Classification Search
  USPC ................................. 370/252, 329, 331, 386
  See application file for complete search history.

(56) References Cited

U.S. PATENT DOCUMENTS

2019/0124015 A1\* 4/2019 Loehr .................... H04L 67/322
2019/0313359 A1\* 10/2019 Lee ......................... H04W 4/12
2019/0335532 A1\* 10/2019 Kim ........................ H04W 4/40
2020/0267650 A1\* 8/2020 Lee ....................... H04W 28/08

\* cited by examiner

VEHICLE-TO-EVERYTHING (V2X) COMMUNICATION AUTHORIZATION IN FIFTH GENERATION (5G) SYSTEMS

RELATED APPLICATIONS

This application claims priority to U.S. Provisional Application No. 62/687,702, filed Jun. 20, 2018, which is hereby incorporated by reference in its entirety.

FIELD

Various embodiments generally may relate to the field of wireless communications. More particularly, embodiments described herein relate to authorization of a User Equipment (UE) to use a Fifth Generation (5G) system for the purpose of Vehicle-to-Everything (V2X) communication.

BACKGROUND

Vehicle-to-everything (V2X) communication is the communication of information between a vehicle and any entity that may be associated with the vehicle. Authorization of a User Equipment (UE) to use a Fifth Generation (5G) system for the purpose of Vehicle-to-Everything (V2X) communication remains suboptimal.

BRIEF DESCRIPTION OF THE FIGURES

Embodiments described herein are illustrated by way of example and not limitation in the figures of the accompanying drawings, in which like references indicate similar features. Furthermore, in the figures, some conventional details have been omitted so as not to obscure from the inventive concepts described herein.

DETAILED DESCRIPTION

Figure 1:
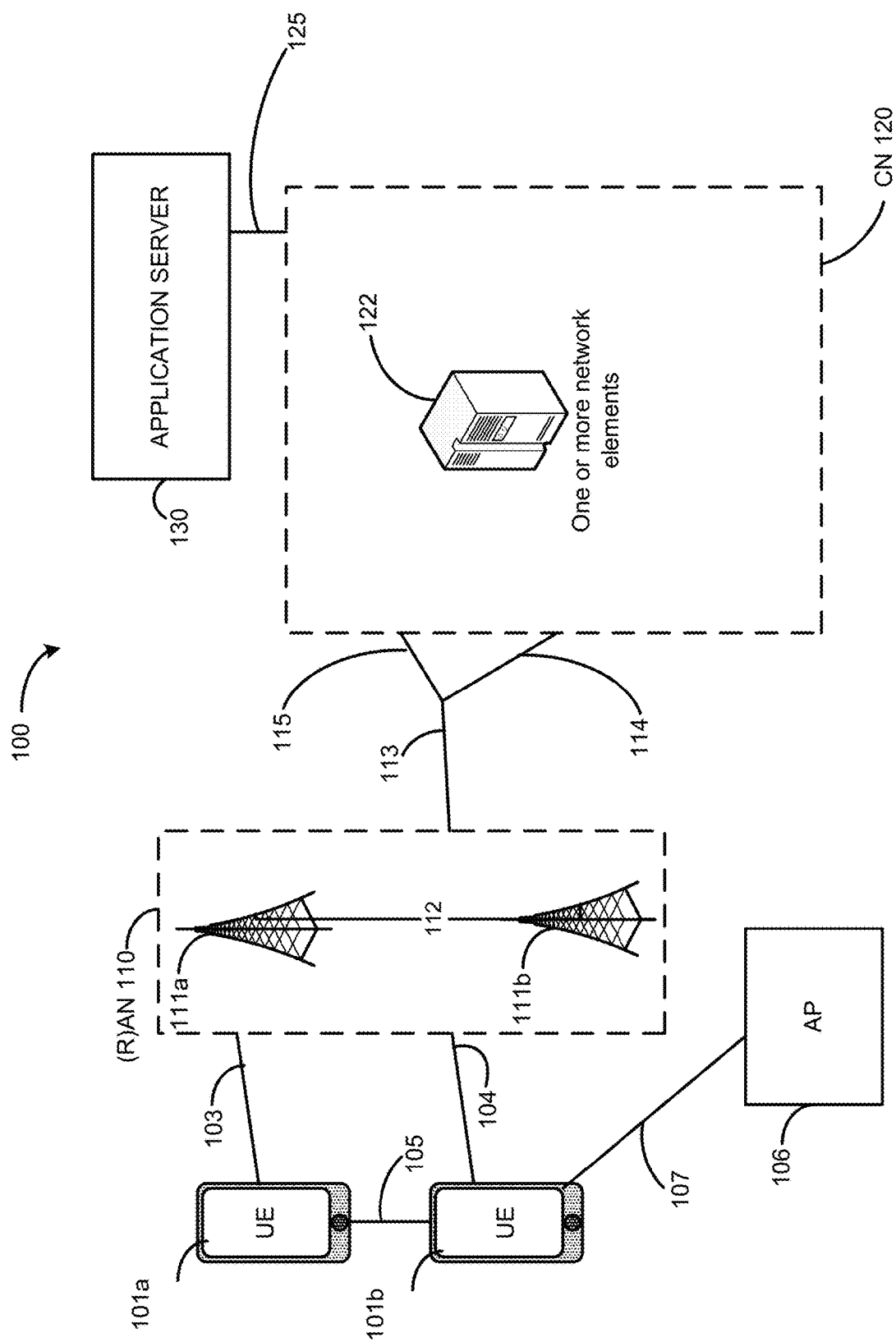
FIG. 1 illustrates an example architecture of a system of a network, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B," "A/B," "one or more of A and B," "at least one of A or B," and "at least one of A and B" means (A), (B), or (A and B).

In one or more embodiments, during an initial registration procedure or an attach procedure, a UE includes its 5G V2X capability in a Non Access Stratum (NAS) message to a Mobility Management Entity (MME) or an Access and Mobility Management Function (AMF). The MME or the AMF stores this information and determines whether the UE is authorized to use V2X communication over a device-to-device (D2D) sidelink (PC5) reference point based on subscription information received from a Home Subscriber Server (HSS) or a Unified Data Management (UDM). If the UE is authorized, the MME or the AMF includes the V2X services authorized in the S1 Application Protocol (S1AP) or the N2 message from the MME or the AMF to an Evolved Universal Mobile Telecommunications System Terrestrial Radio Access Network (E-UTRAN) or a Next Generation Radio Access Network (NG RAN). Other embodiments apply the same principle described above to the Service request procedure, Tracking Area Update (TAU) procedure, Xn based handover procedure, and S1 based handover procedure with procedural changes.

Several advantages accrue from the embodiments described herein. For example, embodiments described herein enable authorization of 5G V2X communication over the PC5 interface. Another advantage is that embodiments described herein can assist with preventing users of UEs from infringing proprietary technology (e.g., patented technology, etc.).

In what follows, various operations may be described as multiple discrete actions or operations, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," "A/B," "at least one of A or B," "at least one of A and B," "one or more of A and B," "one or more of A or B," and mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, including in the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an example architecture of a system 100 of a network, in accordance with various embodiments. The following description is provided for an example system 100 that operates in conjunction with the as Long Term Evolution (LTE) system standards and the Fifth Generation (5G) or New Radio (NR) system standards as provided by third Generation Partnership Project (3GPP) technical specifications (TS). However, the example embodiments are not limited in this regard and the described embodiments may apply to other networks that benefit from the principles described herein, such as future 3GPP systems (e.g., Si20th Generation (6G)) systems, Institute of Electrical and Electronics Engineers (IEEE) 802.16 protocols (e.g., Wireless metropolitan area networks (MAN), Worldwide Interoperability for Microwave Access (WiMAX), etc.), or the like.

As shown by FIG. 1, the system 100 may include user equipment (UE) 101a and UE 101b (collectively referred to as "UEs 101" or "UE 101"). As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 101 can comprise an IoT UE, which may comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with an access network (AN) or radio access network (RAN) 110. In embodiments, the RAN 110 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Spécial Mobile) EDGE (GSM Evolution) Radio Access Network). As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 101 may directly exchange communication data via a ProSe interface 105. The ProSe interface 105 may alternatively be referred to as a sidelink (SL) interface 105 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 101b is shown to be configured to access an access point (AP) 106 (also referred to as also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 101b, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 101b in RRC_CONNECTED being configured by a RAN node 111 to utilize radio resources of LTE and WLAN. LWIP operation may involve the UE 101b using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." As used herein, the term "NG RAN node" or the like may refer to a RAN node 111 that operates in an NR or 5G system 100 (for example a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 111 may be implemented as one or more software entities running on server computers as part of a virtual network, which may be referred to as a cloud radio access network (CRAN). In other embodiments, the RAN nodes 111 may represent individual gNB-distributed units (DUs) that are connected to a gNB-centralized unit (CU) via an F1 interface (not shown by FIG. 1).

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101, 102 and the RAN nodes 111, 112 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101, 102 and the RAN nodes 111, 112 may operate using Licensed Assisted Access (LAA), enhanced LAA (eLAA), and/or further eLAA (feLAA) mechanisms. In these implementations, the UEs 101, 102 and the RAN nodes 111, 112 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101, 102, RAN nodes 111, 112, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called carrier sense multiple access with collision avoidance (CSMA/CA). Here, when a WLAN node (e.g., a mobile station (MS) such as UE 101 or 102, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y extended CCA (ECCA) slots, where X and Y are minimum and maximum values for the CWSs for LAA. In one example, the minimum CWS for an LAA transmission may be nine microseconds (µs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In Frequency Division Duplexing (FDD) systems, the number of aggregated carriers can be different for DL and UL, where the number of UL CCs is equal to or lower than the number of DL component carriers. In some cases, individual CCs can have a different bandwidth than other CCs. In Time Division Duplexing (TDD) systems, the number of CCs as well as the bandwidths of each CC is usually the same for DL and UL.

CA also comprises individual serving cells to provide individual CCs. The coverage of the serving cells may differ, for example, due to that CCs on different frequency bands will experience different pathloss. A primary service cell or primary cell (PCell) may provide a Primary CC (PCC) for both UL and DL, and may handle Radio Resource Control (RRC) and Non access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UE 101, 102 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different Physical Uplink Shared Channel (PUSCH) starting positions within a same subframe.

The physical downlink shared channel (PDSCH) may carry user data and higher-layer signaling to the UEs 101. The physical downlink control channel (PDCCH) may carry information about the transport format and resource allocations related to the PDSCH channel, among other things. It may also inform the UEs 101 about the transport format, resource allocation, and H-ARQ (Hybrid Automatic Repeat Request) information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e20ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 111 may be configured to communicate with one another via interface 112. In embodiments where the system 100 is an LTE system, the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, Core Network (CN) 120. The CN 120 may comprise a plurality of network elements 122, which are configured to offer various data and telecommunications services to customers/subscribers (e.g., users of UEs 101) who are connected to the CN 120 via the RAN 110. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS Packet Services (PS) domain, LTE PS data services, etc.). The application server 130 can also be configured to support one or more communication services (e.g., Voice-over-Internet Protocol (VoIP) sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a user plane function (UPF), and the S1 control plane (NG-C) interface 115, which is a signaling interface between the RAN nodes 111 and Access and Mobility Functions (AMFs). Embodiments where the CN 120 is a 5GC 120 are discussed in more detail with regard to FIG. 17.

Figure 16:
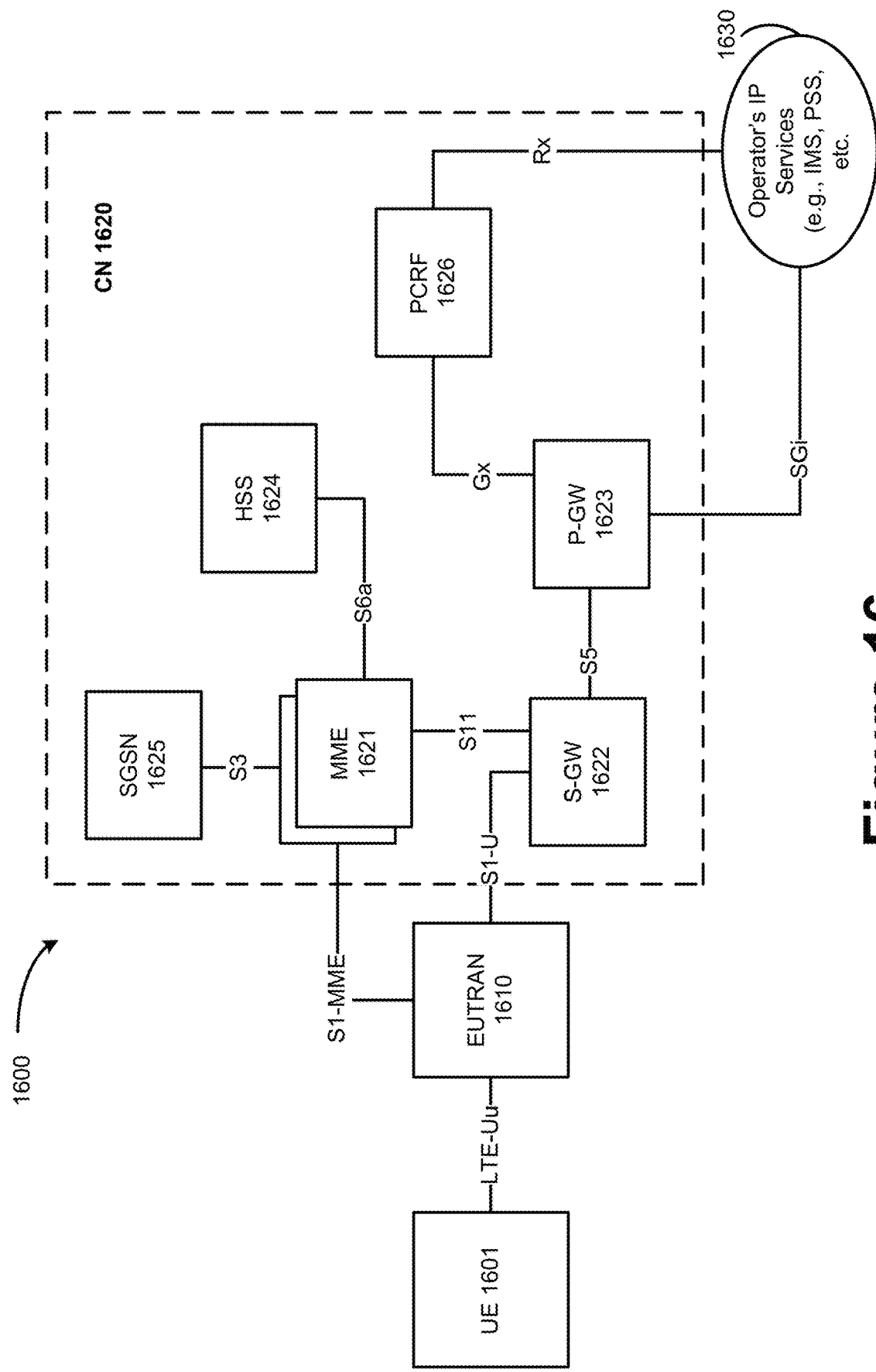
FIG. 16 illustrates an example architecture of a system including a first CN, in accordance with various embodiments.

In embodiments, the CN 120 may be a 5G CN (referred to as "5GC 120" or the like), while in other embodiments, the CN 120 may be an Evolved Packet Core (EPC)). Where CN 120 is an EPC (referred to as "EPC 120" or the like), the RAN 110 may be connected with the CN 120 via an S1 interface 113. In embodiments, the S1 interface 13 may be split into two parts, an S1 user plane (S1-U) interface 114, which carries traffic data between the RAN nodes 111 and the serving gateway (S-GW), and the S1-mobility management entity (MME) interface 115, which is a signaling interface between the RAN nodes 111 and MMEs. An example architecture wherein the CN 120 is an EPC 120 is shown by FIG. 16.

For the Combined 4G and 5G Deployment Scenario where the NG RAN is the Secondary Radio Access Network (RAN) Node Using an EPC Embodiments described herein include combined fourth generation (4G) and 5G deployment scenarios where the E-UTRAN or the NG RAN is the secondary RAN node using an EPC.

Figure 2:
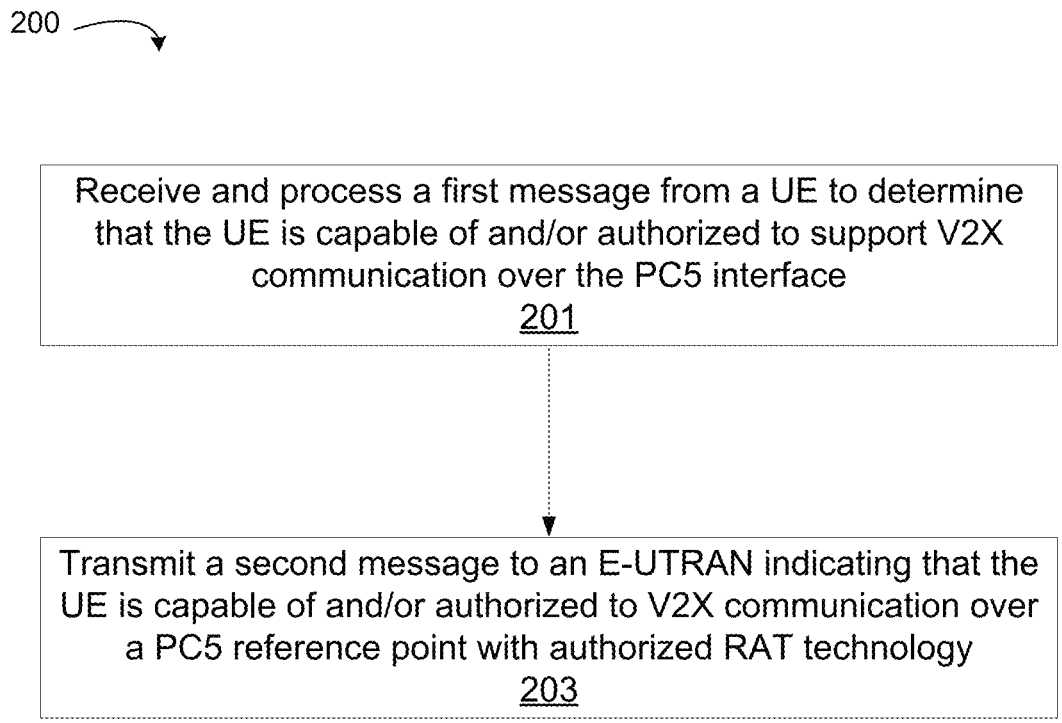
FIG. 2 illustrates, in flowchart form, a process applicable to a fifth generation (5G) deployment scenario is shown, in accordance with various embodiments.

With regard now to FIG. 2, a process 200 applicable to a 5G deployment scenario (option No. 3) is shown. Referring now to operation 201, in one embodiment, an MME receives and processes a first message that originates from a UE to determine that the UE is capable of and/or authorized for V2X communication over a PC5 interface. Next, in operation 203, the MME communicates a second message to an E-UTRAN. In one embodiment, the second message includes information indicating that the UE is capable of and/or authorized to support V2X communication over a PC5 reference point with authorized RAT technology. In one embodiment that is applicable to the process 200 shown in FIG. 2A, both an Evolved UTRAN (E-UTRAN) and an NG RAN connect to a EPC and the E-UTRAN is the master RAN node. In this embodiment, the MME performs additional functions to support V2X communication over a PC5 reference point. For example, and in one embodiment, the MME provides an indication to the E-UTRAN that the UE is authorized to use V2X communication over the PC5 reference point and the authorized Radio Access Technology (RAT) (e.g., E-UTRA, New Radio (NR), any other RAT, etc.).

Figure 3:
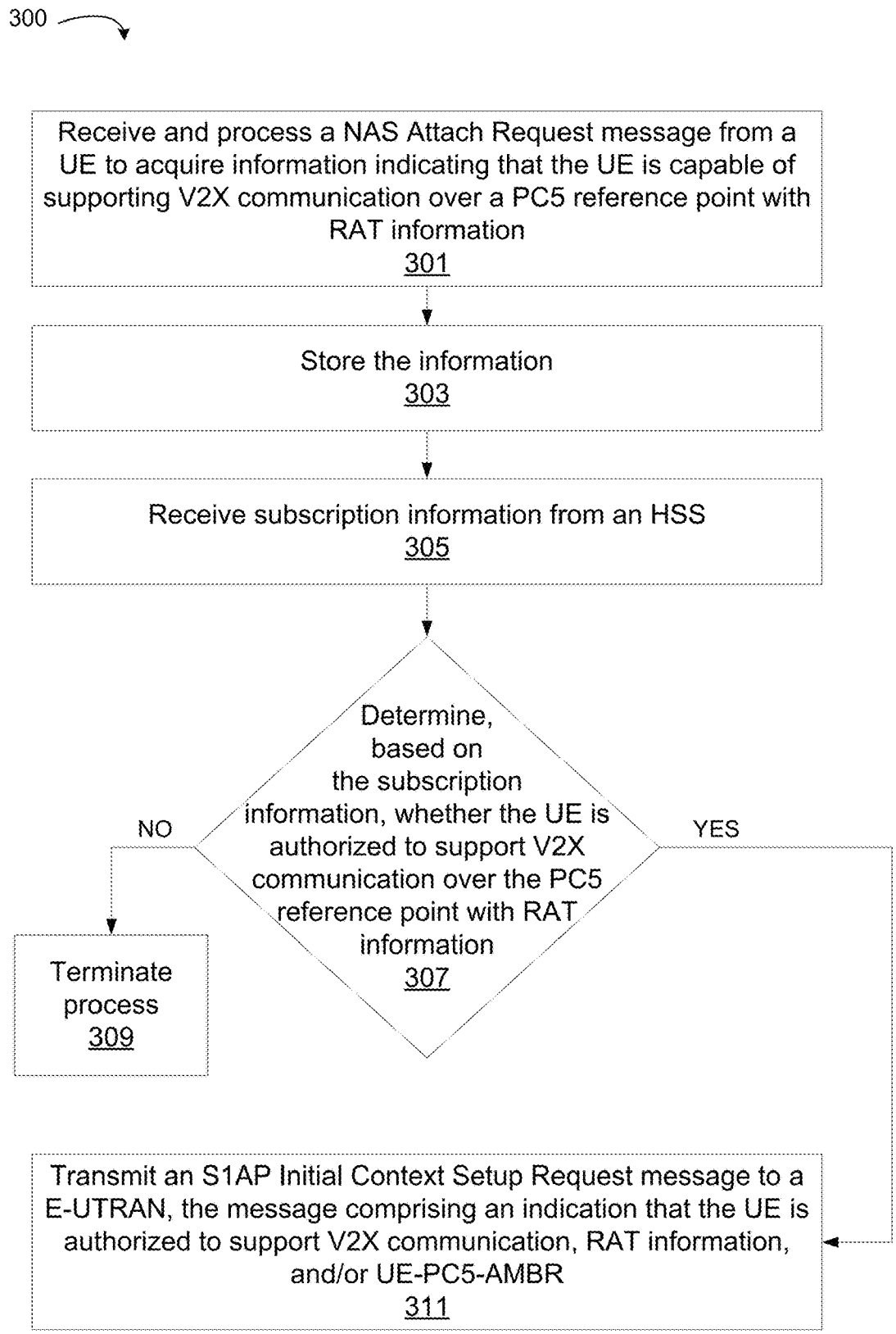
FIG. 3 illustrates, in flowchart form, an embodiment of at least one portion of a 5G Access Node (AN) attach process.

With regard now to FIG. 3, an embodiment of at least one portion of a 5G Access Node (AN) attach process 300 is shown. The process 300 begins at operation 301. Here, during the 5G Access Node (AN) attach procedure 300, a UE generates an NAS Attach Request message. In one embodiment, the UE includes a V2X capability indication as part of the "UE Network capability" in NAS Attach Request message. In one embodiment, an MME receives and processes the NAS Attach Request message to acquire the information about the V2X capability indication, as shown in operation 301. Next, in operation 303, the MME stores the acquired information for V2X operation. In one embodiment, the information about the V2X capability indication indicates whether the UE is capable of supporting V2X communication over the PC5 reference point with RAT information (e.g., E-UTRA, NR, any other RAT, etc.). Moving on, at operation 307, the MME further determines if the UE is authorized to use the 5G V2X operation based on the received subscription information from an HSS. As shown in operation 309, the process 300 is terminated if the UE is not authorized. On the other hand, and as shown in operation 311, if the UE is authorized to use the V2X communication over the PC5 interface for a specific RAT (e.g., E-UTRA, NR, any other RAT, etc.), the MME includes a "V2X services authorized" indication, RAT information (e.g. E-UTRA, NR), and UE-PC5-Aggregate Maximum Bit Rate (AMBR) in the S1 Application Protocol (S1AP) Initial Context Setup Request to the E-UTRAN. The "V2X services authorized" indication sent to the E-UTRAN denotes the UE is authorized to use V2X communication over PC5 reference point. The UE-PC5-AMBR is sent to E-UTRAN for the resources management of UE's PC5 transmission in V2X communication. The RAT information (e.g. E-UTRA, NR, etc.) indicates which RAT is authorized to be used for V2X communication over PC5 reference point.

In one embodiment, during a Service Request Process, if the UE is V2X capable and authorized to use V2X communication over a PC5 reference point with RAT information based on the subscription data, then the MME includes a "V2X services authorized" indication, RAT information (e.g., E-UTRA, NR, any other RAT, etc.), and UE-PC5-AMBR in the S1AP Initial Context Setup Request message to E-UTRAN. The Service Request Process is performed with the same or similar operations as those set forth in the process 300, with the exception that the UE transmits its V2X capability indication as part of the "UE Network capability" in a message that is not an NAS Attach Request message.

Figure 4:
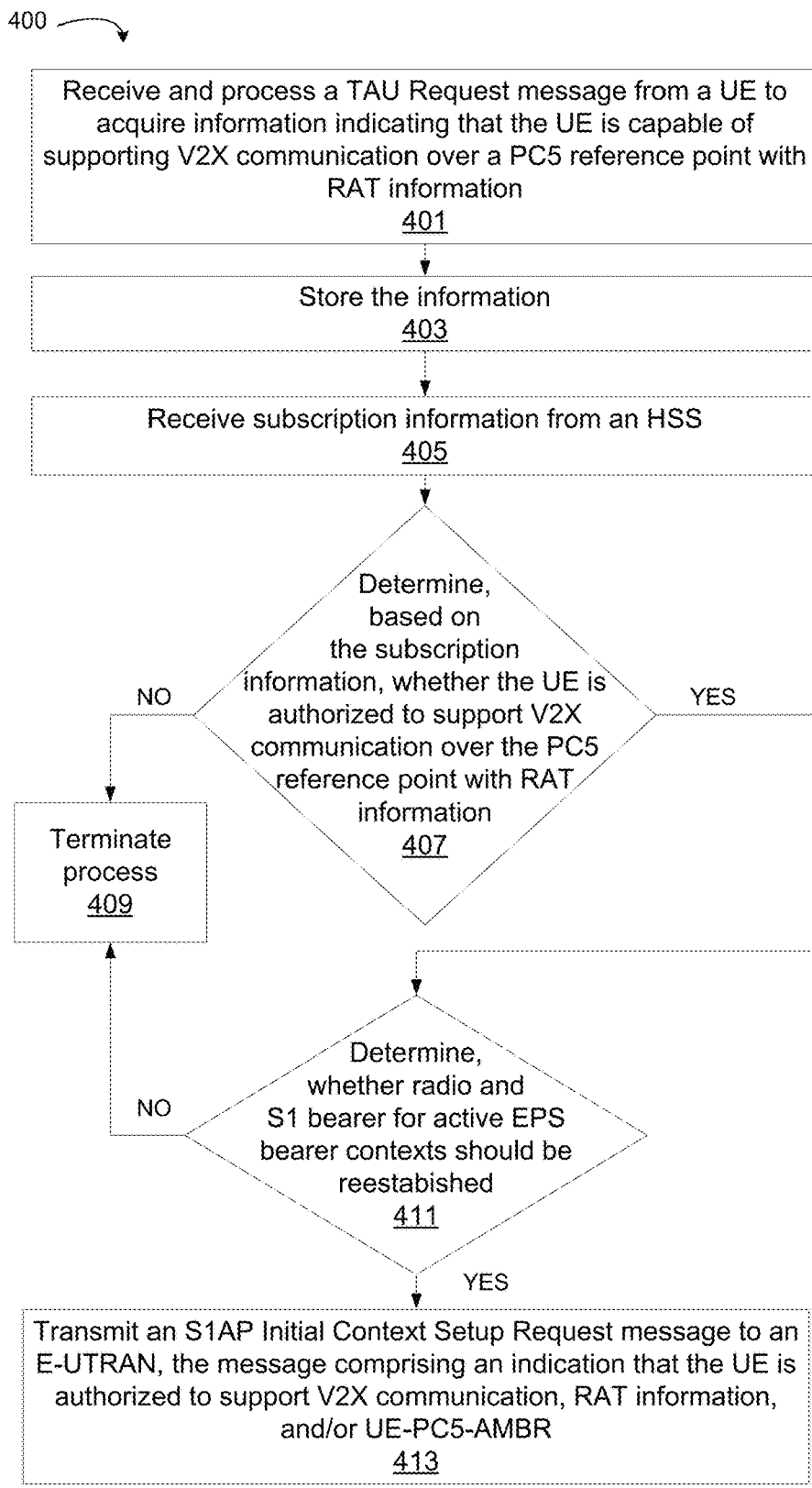
FIG. 4 illustrates, in flowchart form, an embodiment of at least one portion of Tracking Area Update (TAU) process.

Moving on to FIG. 4, an embodiment of at least one portion of Tracking Area Update (TAU) process 400 is shown. The process 400 begins at operation 401. Here, during the TAU process 400, the UE includes the V2X capability indication as part of the "UE Network Capability" in the TAU Request message. The MME receives and processes the TAU Request message to acquire the V2X capability information, as shown in operation 401. Next, and with regard to operation 403, the MME stores this information for the V2X operation. If the UE is V2X capable and authorized to use V2X communication over a PC5 reference point based on the subscription data (operations 405 and 407) and the MME determines that the radio and S1 bearers for all active Evolved Packet System (EPS) bearer contexts should be reestablished due to the "active flag" included in the TAU Request message or pending downlink (DL) data or signaling (operations 411), the MME includes a "V2X services authorized" indication, RAT information (e.g. E-UTRA, NR), and UE-PC5-AMBR in the S1AP Initial Context Setup Request message to E-UTRAN (operation 413). As shown in FIG. 4, the process 400 will be terminated (operation 409) if operation 407 or operation 411 results in a negative determination.

Figure 5:
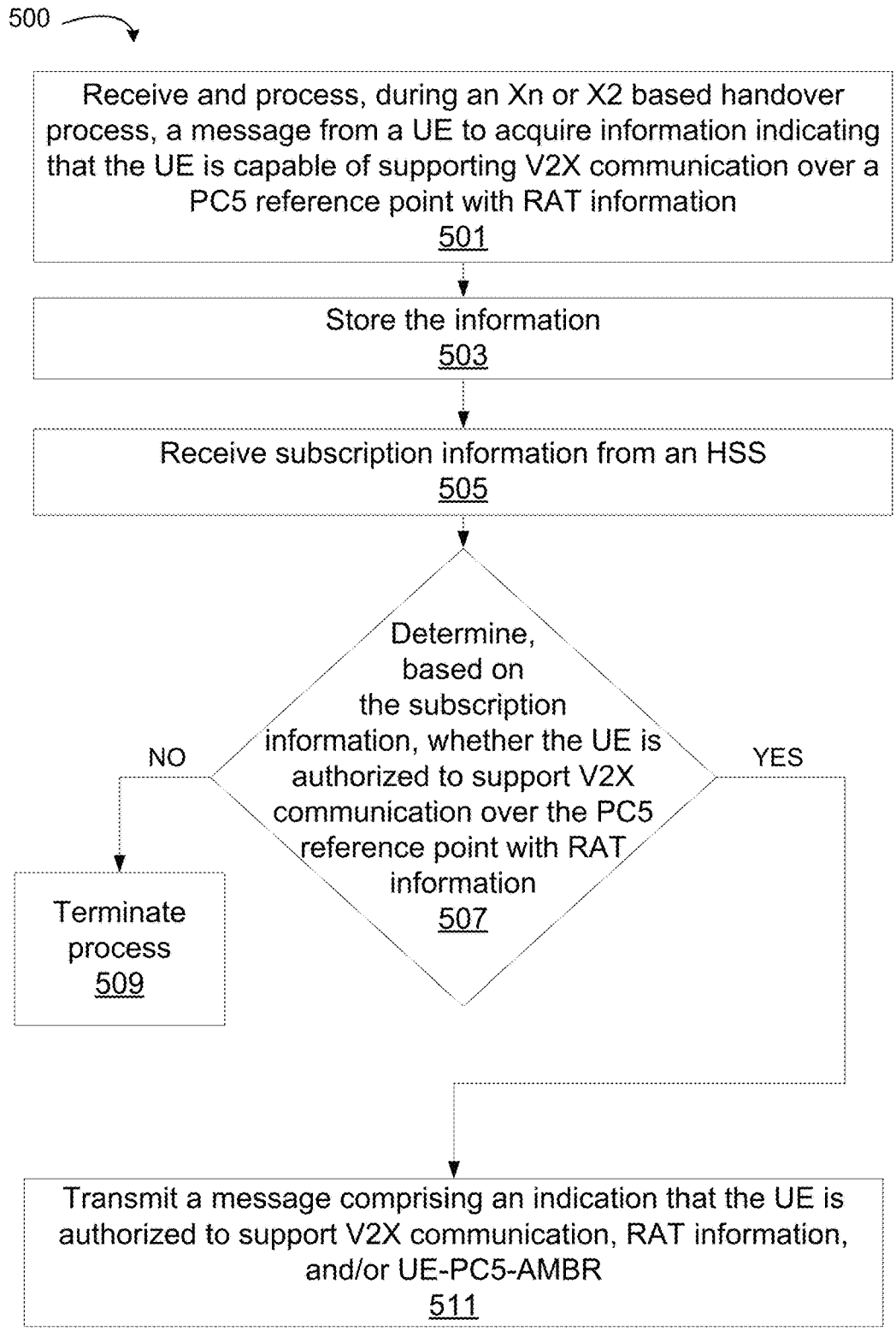
FIG. 5 illustrates, in flowchart form, an embodiment of at least one portion of an Xn or X2 based handover process is shown.

Referring now to FIG. 5, an embodiment of at least one portion of an Xn or X2 based handover process 500 is shown. The process 500 begins at operation 501. Here, during the Xn (or X2) (the interface between E-UTRANs) based handover procedure, if the UE is V2X capable (operations 501 and 503), and the UE is authorized to use V2X communication over a PC5 reference point with RAT information based on the subscription data (operations 505 and 507), the "V2X services authorized" indication, RAT information (e.g. E-UTRA, NR), and the UE-PC5-AMBR are sent to the target E-UTRAN. As shown in FIG. 5, the process 500 will be terminated (operation 509) if operation 507 results in a negative determination. In one embodiment associated with the process 500, if the source E-UTRAN is V2X enabled and the "V2X services authorized" indication is included in the UE context, then the source E-UTRAN may include a "V2X services authorized" indication, RAT information (e.g. E-UTRA, NR), and UE-PC5-AMBR in the Xn-AP Handover Request message to the target E-UTRAN. In one embodiment, if the UE is V2X capable, and the UE is authorized to use V2X communication over PC5 reference point based on the subscription data, then the MME may send the "V2X services authorized" indication and the UE-PC5-AMBR to the target 5G AN in the Path Switch Request Acknowledge message.

Figure 6:
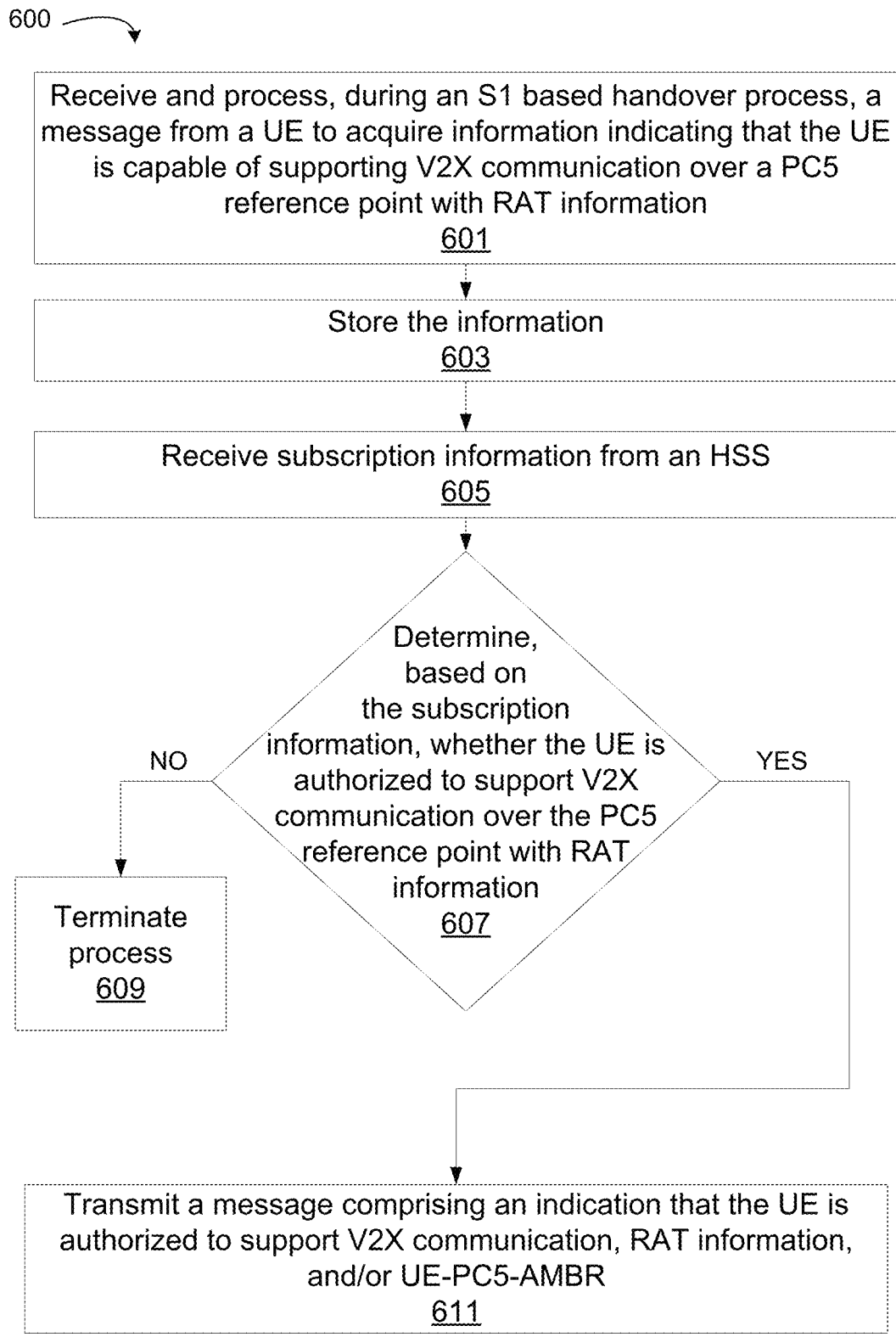
FIG. 6 illustrates, in flowchart form, an S1 based handover procedure.

With regard now to FIG. 6, an S1 based handover procedure 600 is shown. During the S1 based handover procedure, if the UE is V2X capable (operations 601 and 603), and the UE is authorized to use V2X communication over a PC5 reference point based on the subscription data (operations 605 and 607), the "V2X services authorized" indication, RAT information (e.g. E-UTRA, NR), and UE-PC5-AMBR are sent to the target E-UTRAN by the target MME. In one embodiment, for the intra-MME handover, the "V2X services authorized" indication, RAT information (e.g. E-UTRA, NR), and UE-PC5-AMBR are included in the S1AP Handover Request message. In one embodiment, for the inter-MME handover or inter-RAT handover to the E-UTRAN, the "V2X services authorized" indication, RAT information (e.g., E-UTRA, NR, any other RAT, etc.), and UE-PC5-AMBR are included in the S1AP Handover Request message sent to the target E-UTRAN during the handover procedure.

Figure 7:
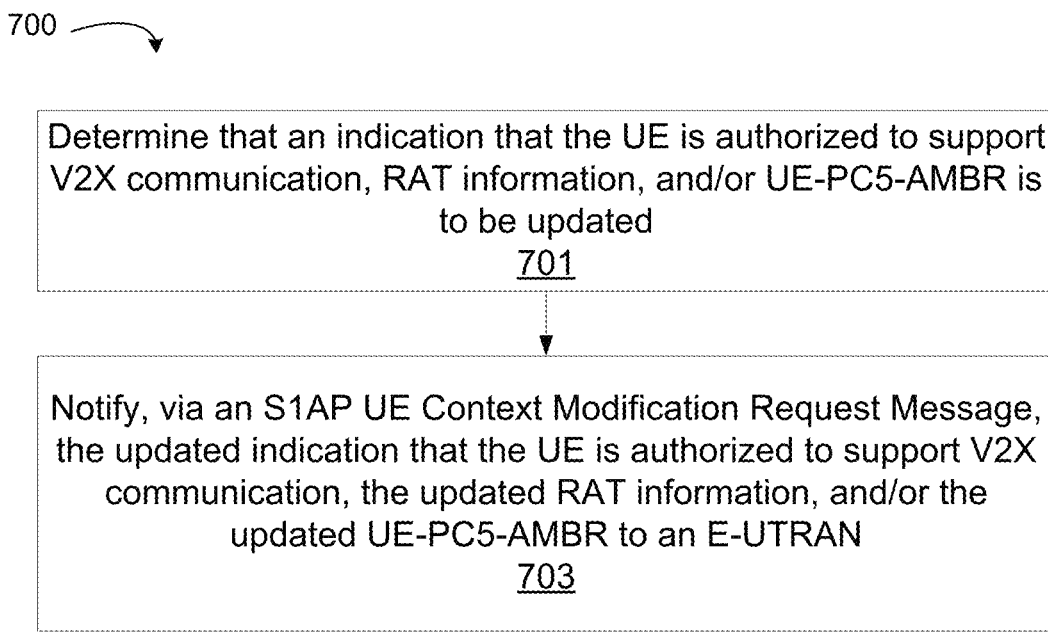
FIG. 7 illustrates, in flowchart form, an exemplary Insert Subscriber Data process.

With regard now to FIG. 7, an exemplary Insert Subscriber Data process 700 is shown. In one or more embodiments, Insert Subscriber Data processes for a UE may include various operations. For example, with regard to the process 700, if the "V2X services authorized" indication, RAT information (e.g. E-UTRA, NR), or the UE-PC5-AMBR is to be changed due to changed subscription data and the S1 bearer is established (operation 701), then the MME notifies the E-UTRAN of the updated "V2X services authorized" indication, the updated RAT information (e.g. E-UTRA, NR), or the updated UE-PC5-AMBR via the S1AP UE Context Modification Request message that is transmitted by the MME to the E-UTRAN (operation 703).

In one embodiment, a Purge of Subscriber Data process for a UE may be performed as well. For example, the Purge of Subscriber Data process may be performed using known techniques of performing such a process.

For the Standalone 5G Deployment and the Combined 4G and 5G Deployment Scenario where the NG RAN is the Master RAN Node Using a 5GC (5G Core Network)

Embodiments herein may also include standalone 5G deployment and the combined 4G and 5G deployment scenario where the NG RAN is the master RAN node using 5GC.

Figure 8:
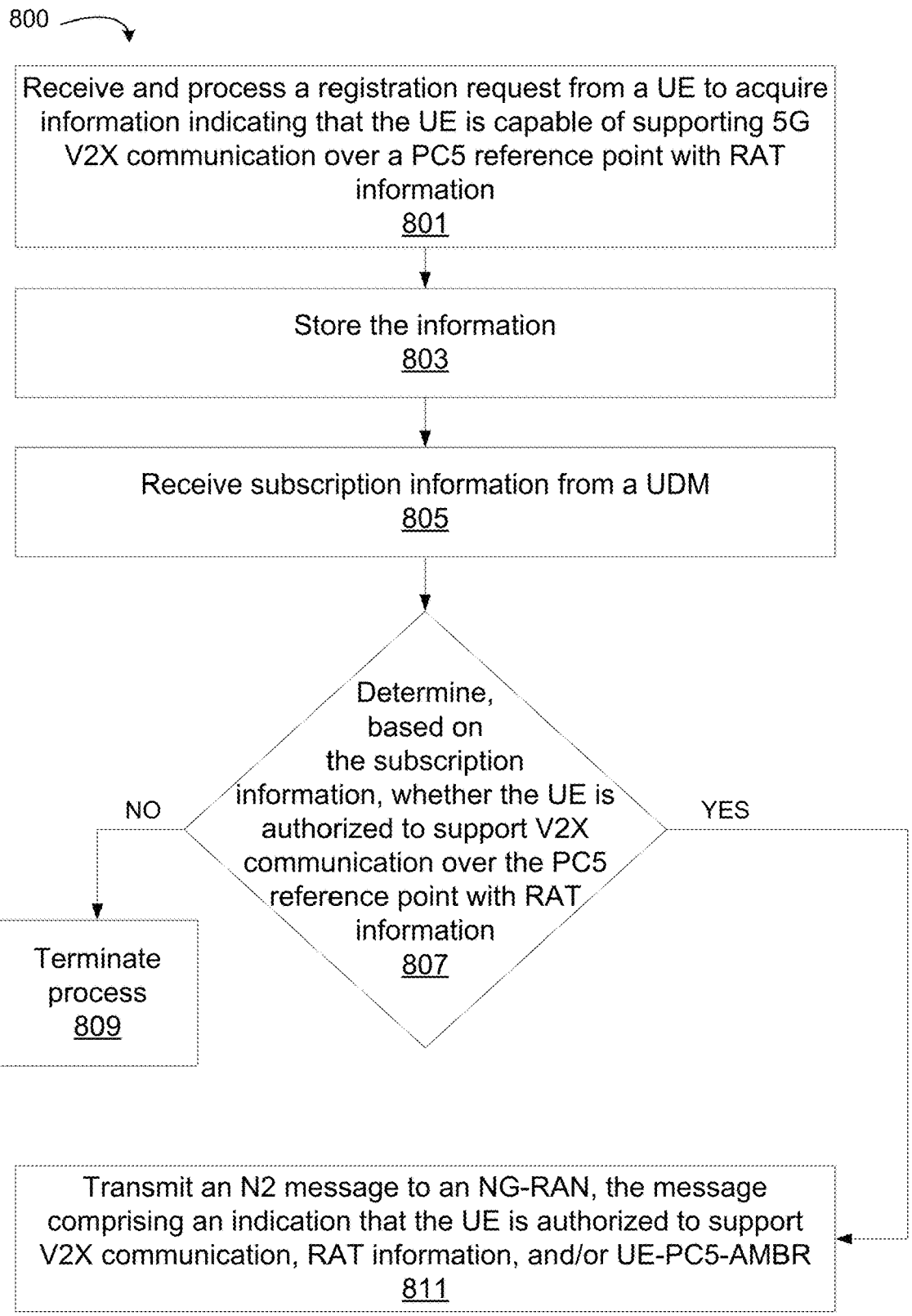
FIG. 8 illustrates, in flowchart form, an embodiment of at least one portion of a Registration process in a 5G system.

With regard now to FIG. 8, an embodiment of at least one portion of a Registration process 800 in a 5G system is shown. The process 800 begins at operation 801. Here, during a Registration process 800 in a 5G system, a UE includes its 5G V2X capability as a part of the "UE 5GCN capability" to an AMF in the Registration Request message. The AMF receives the Registration Request message from the UE (operation 801) and processes the information to acquire information indicating that the UE is capable of supporting 5G V2X communication over a PC5 reference point with RAT information. Next, and in this embodiment, the AMF stores this information for a V2X operation (operation 803). This V2X capability indicates whether the UE is capable of supporting V2X communication over a PC5 reference point with RAT information (e.g., E-UTRA, NR, any other RAT, etc.). In one embodiment, the AMF also determines whether the UE is authorized to use the 5G V2X operation based on the received subscription information received from a UDM (operations 805 and 807). If the UE is authorized to use V2X communication over the PC5 interface for a specific RAT, the AMF includes a "V2X services authorized" indication with RAT information (e.g., E-UTRA, NR, any other RAT, etc.) and UE-PC5-AMBR in the N2 message from the AMF to the NG RAN indicating that the UE is authorized to use V2X communication over the PC5 interface (operation 811). In one embodiment, the "V2X services authorized" indication sent to the NG RAN denotes that the UE is authorized to use V2X communication over a PC5 reference point. The UE-PC5-AMBR is sent to the NG RAN for resource management of the UE's PC5 transmission in V2X communication. The RAT information (e.g., E-UTRA, NR, any other RAT, etc.) indicates which RAT is authorized to be used for V2X communication over a PC5 reference point. As shown in FIG. 8, the process 800 will be terminated (operation 809) if operation 811 results in a negative determination.

Figure 9:
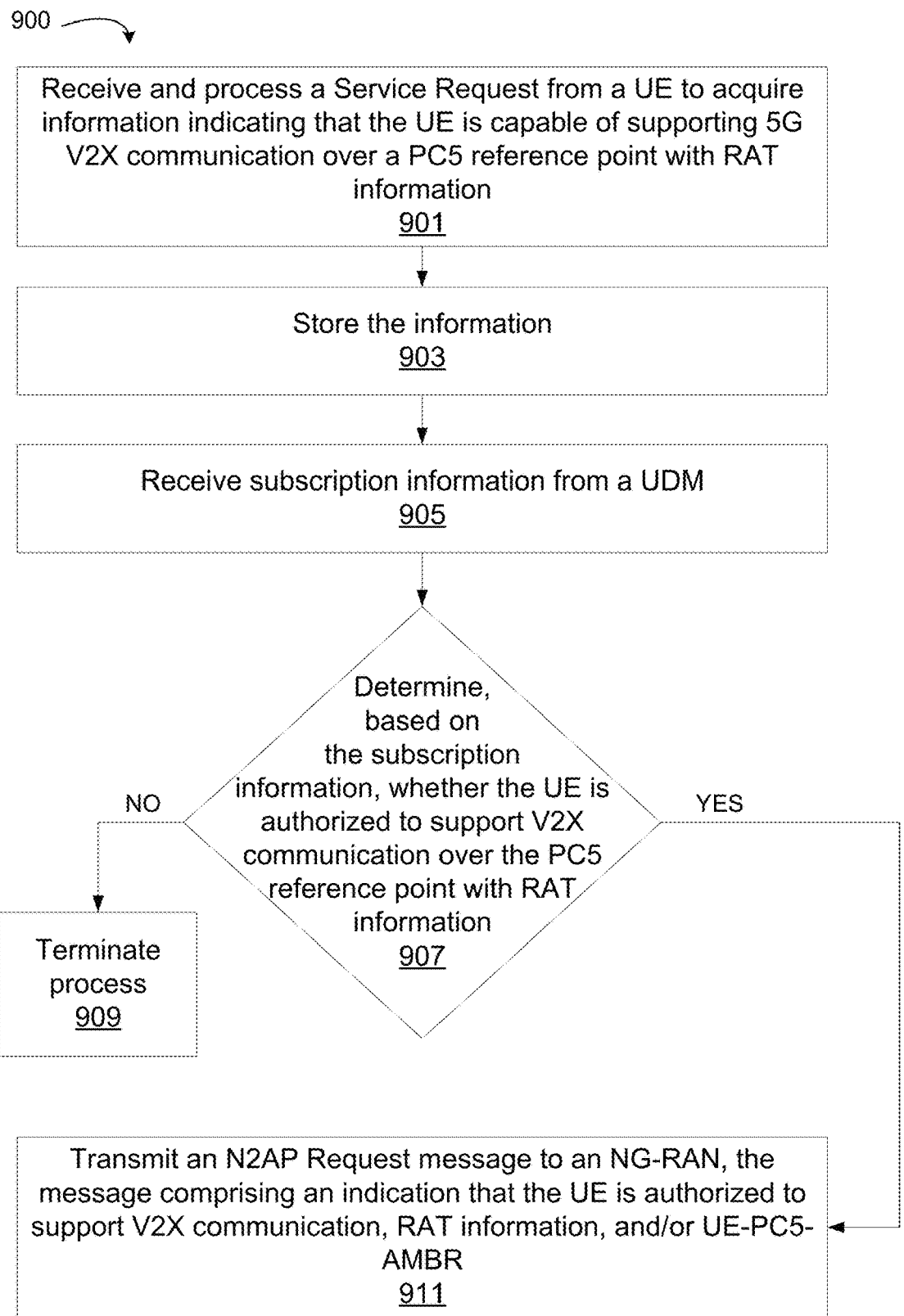
FIG. 9 illustrates, in flowchart form, an embodiment of at least one portion of a Service Request process

Moving on to FIG. 9, an embodiment of at least one portion of a Service Request process 900 is shown. In one embodiment, the process 900 begins at operation 901. Here, during the Service Request procedure 900, the UE includes the V2X capability indication in a Service Request message. This message is received by the AMF and processed to acquire information indicating that the UE is capable of supporting 5G V2X communication over a PC5 interface with RAT information (operation 901). Next, at operation 903, the AMF stores this information for the V2X operation. Moving on to operations 905 and 907, if the UE is V2X capable and authorized to use V2X communication over a PC5 reference point for a specific RAT based on the subscription data, then the AMF includes a "V2X services authorized" indication, RAT information (e.g., E-UTRA, NR, any other RAT, etc.), and UE-PC5-AMBR in the N2AP Request message to the NG RAN.

Figure 10:
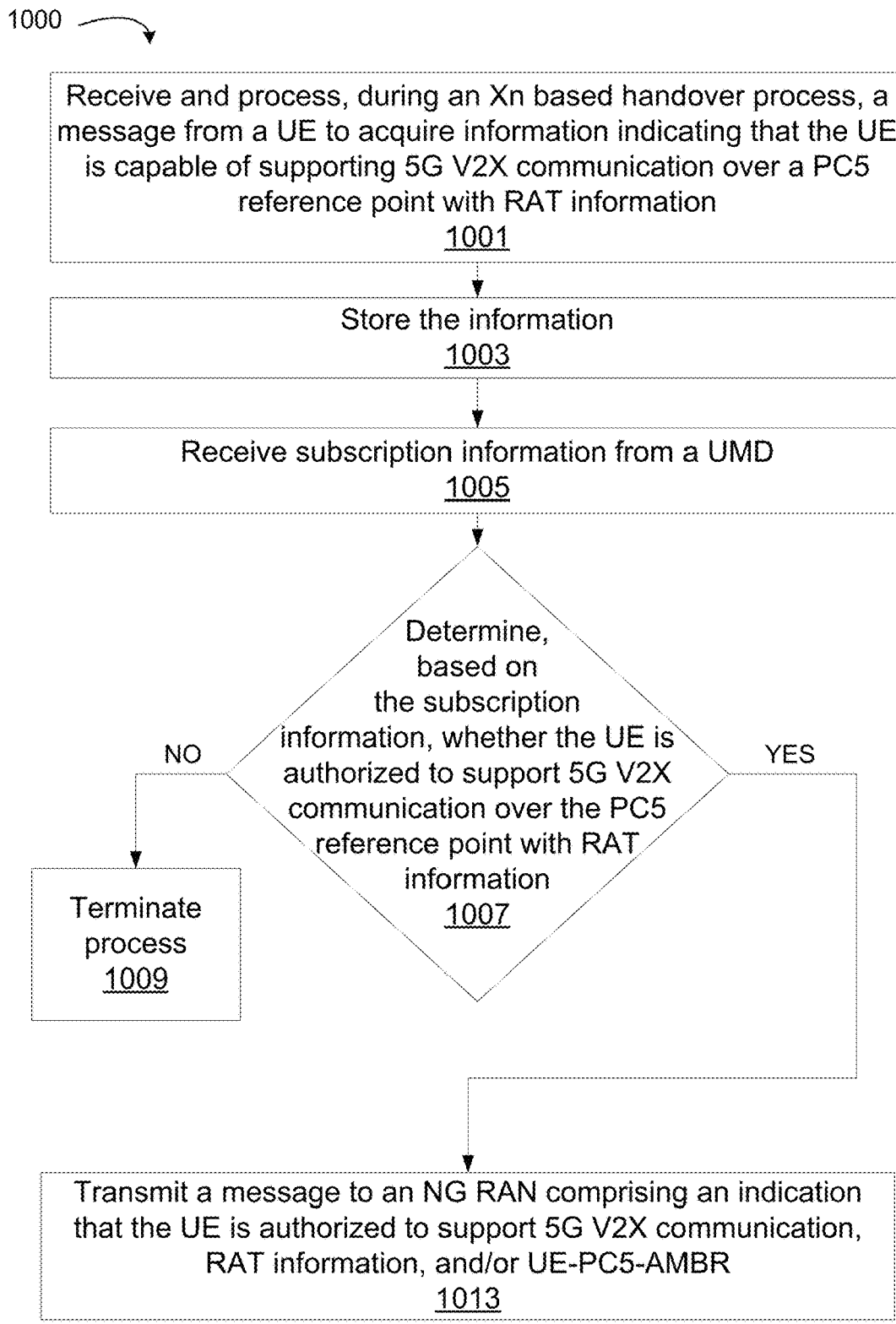
FIG. 10 illustrates, in flowchart form, an embodiment of at least one portion of an Xn based handover procedure.

With regard now to FIG. 10, an embodiment of at least one portion of an Xn based handover procedure 1000 is shown. In one embodiment, during the Xn (the interface between NG RANs) based handover procedure, if the UE is V2X capable (operations 1001 and 1003) and the UE is authorized to use V2X communication over a PC5 reference point for a specific RAT based on the subscription data (operations 1005 and 1007), the "V2X services authorized" indication, RAT information (e.g. E-UTRA, NR), and the UE-PC5-AMBR are sent to the target NG RAN (operation 1013). In one embodiment, if the source NG RAN is V2X enabled and the "V2X services authorized" indication is included in the UE context, then the source NG RAN may include a "V2X services authorized" indication, RAT information (e.g. E-UTRA, NR), and UE-PC5-AMBR in the Xn-AP Handover Request message to the target NG RAN. In one embodiment, if the UE is V2X capable and the UE is authorized to use V2X communication over a PC5 reference point based on the subscription data, then the AMF may send the "V2X services authorized" indication, RAT information (e.g. E-UTRA, NR), and the UE-PC5-AMBR to the target NG RAN in the N2 Path Switch Request Acknowledge message.

Figure 11:
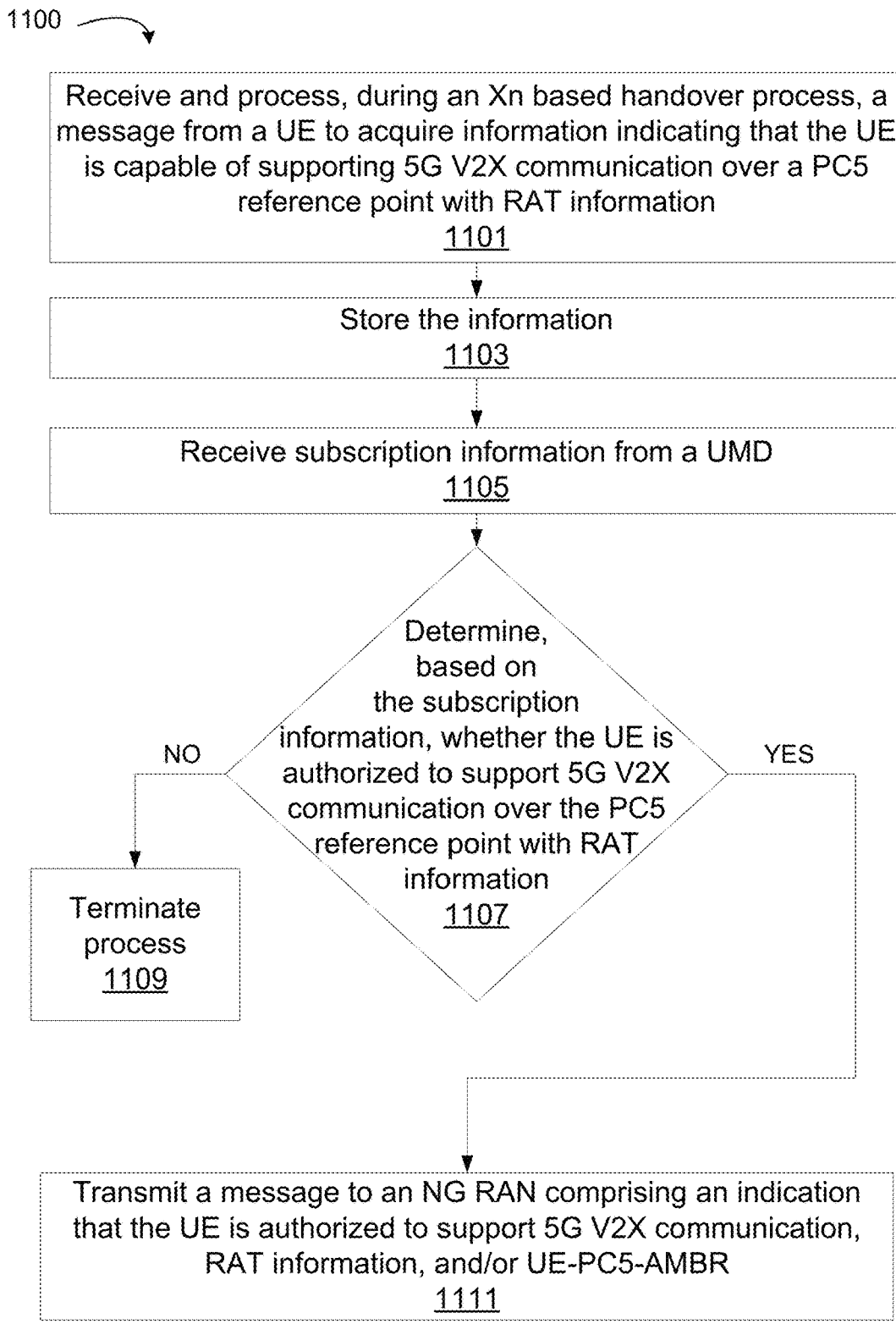
FIG. 11 illustrates, in flowchart form, an embodiment of at least one portion of an N2 based handover process.
Figure 12:
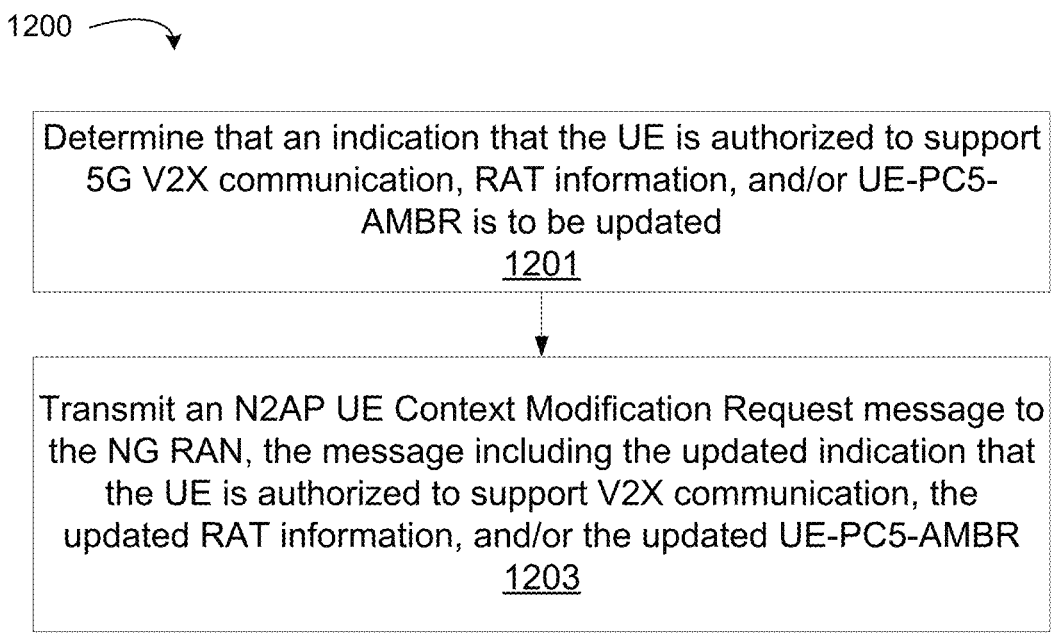
FIG. 12 illustrates, in flowchart form, an embodiment of at least one portion of a Subscriber Data Update Notification process.

Referring now to FIG. 11, an embodiment of at least one portion of an N2 based handover process 1100 is shown. The process 1100 begins are operation 1101. Here, during the N2 based handover procedure, if the UE is V2X capable (operations 1101 and 1103) and the UE is authorized to use V2X communication over a PC5 reference point for a specific RAT based on the subscription data (operations 1105 and 1107), the "V2X services authorized" indication, RAT information (e.g., E-UTRA, NR, any other RAT, etc.), and the UE-PC5-AMBR are sent to the target NG RAN by the target AMF (operation 1111). As shown in FIG. 11, the process 1100 is terminated is operation 1107 results in a negative determination (operation 1109). In one embodiment, for the intra-AMF handover, the "V2X services authorized" indication, RAT information (e.g., E-UTRA, NR, any other RAT, etc.), and UE-PC5-AMBR are included in the N2AP Handover Request message from the AMF to the target NG RAN. In one embodiment, for the inter-AMF handover, the "V2X services authorized" indication, RAT information (e.g., E-UTRA, NR, any other RAT, etc.), and UE-PC5-AMBR are included in the N2AP Handover Request message sent to the target NG RAN during the handover procedure Reference is now made to FIG. 12, an embodiment of at least one portion of a Subscriber Data Update Notification process 1200 is shown. In one embodiment, Subscriber Data Update Notification processes for a UE may be performed with one or more additions. The process 1200 begins operation 1201. Here, if the "V2X services authorized" indication, RAT information (e.g., E-UTRA, NR, any other RAT, etc.), or the UE-PC5-AMBR may need to be changed (e.g., updated, etc.) due to changed subscription data and the UE is in Connected mode (operation 1201), then the AMF may notify the NG RAN of the updated "V2X services authorized" indication, RAT information (e.g. E-UTRA, NR), or the UE-PC5-AMBR via the N2AP UE Context Modification Request message to the NG RAN (operation 1203).

Figure 13:
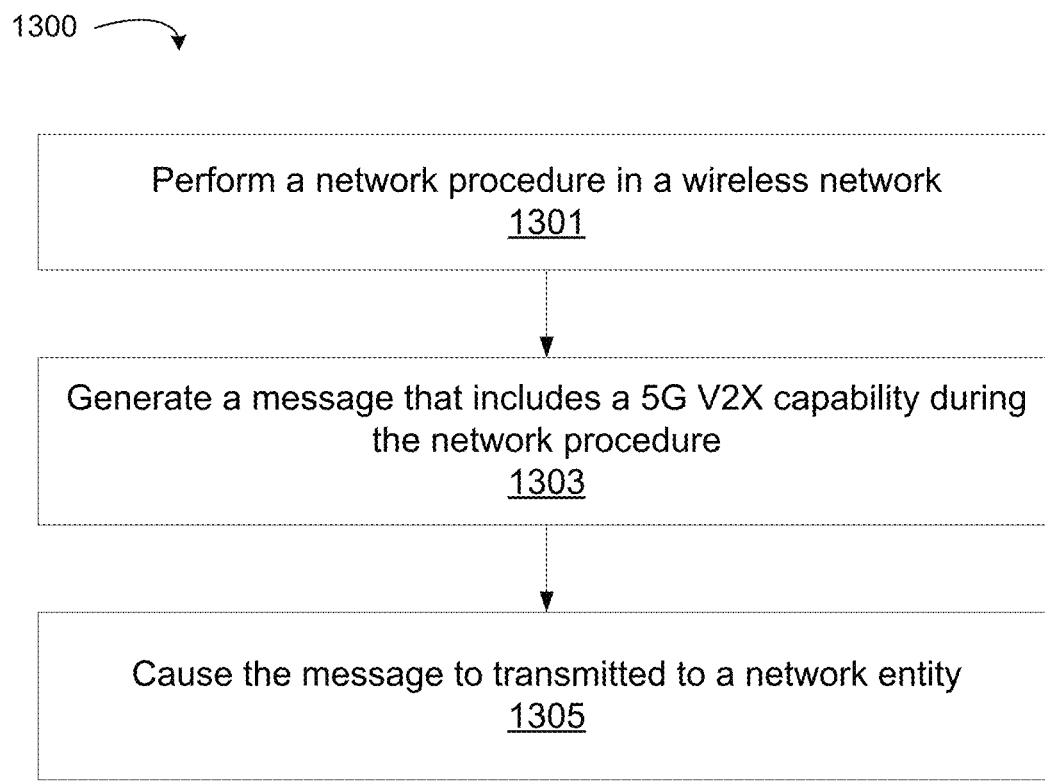
FIG. 13 illustrates, in flowchart form, an embodiment of at least one portion of a process of authorizing V2X communication in a wireless network.

Moving on to FIG. 13, an embodiment of at least one portion of a process 1300 of authorizing V2X communication in a wireless network is shown. In some embodiments, the electronic devices of FIGS. 1-24 may be configured to perform one or more processes, techniques, and/or methods as described herein, or portions thereof. One such process 1300 is depicted in FIG. 13. For example, the process may include: For example, the process may include: performing a network procedure (e.g., accessing an E-UTRAN or an NG RAN, etc.) in a wireless network (e.g., a combination of a 4G network and a 5G network, a 5GC network, etc.) (operation 1301). The process 1300 may also include including a 5G vehicle-to-everything (V2X) capability in a message (e.g., any one of the messages described above in connection with FIGS. 2-12, etc.) during the network procedure (operation 1303). Additionally, the process 1300 may include causing the message to be transmitted to a network entity (e.g., an MME, an AMF, etc.) (operation 1305).

Figure 14:
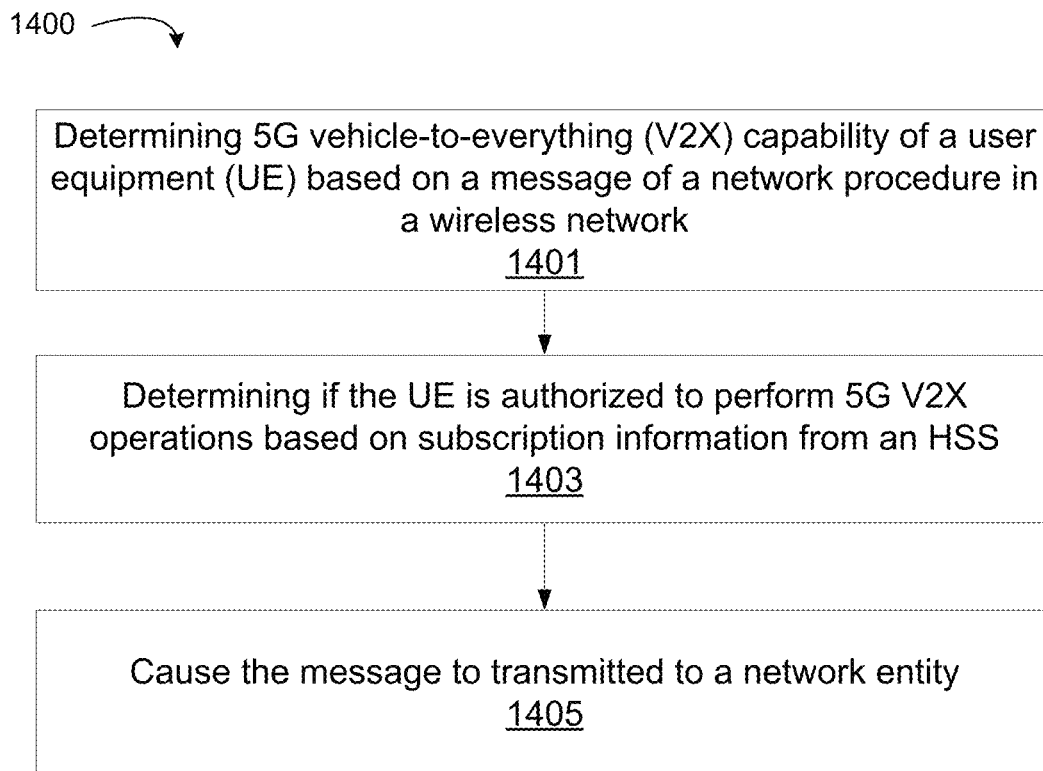
FIG. 14 illustrates, in flowchart form, an embodiment of at least one portion of a process of authorizing V2X communication in a wireless network.
Figure 15:
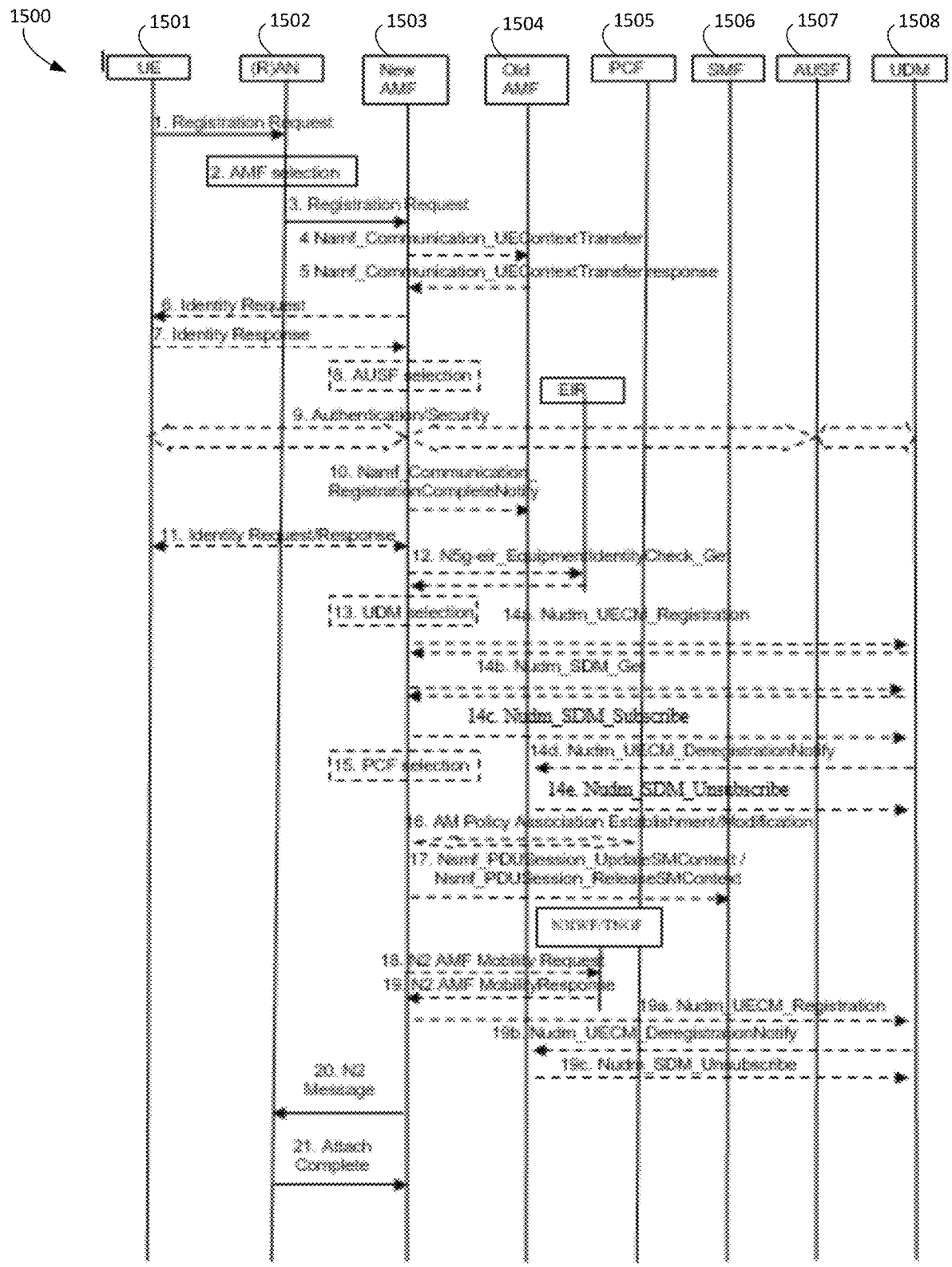
FIG. 15 is a schematic illustration of a process of performing a registration process for V2X communication when a (R)AN (e.g., an NG RAN, etc.) is accessing a 5G Core (5GC) network, according to various embodiments.

Referring now to FIG. 14, an embodiment of at least one portion of a process 1400 of authorizing V2X communication in a wireless network is shown. In some embodiments, the electronic devices of FIGS. 1-24 may be configured to perform one or more processes, techniques, and/or methods as described herein, or portions thereof. One such process 1400 is depicted in FIG. 14. For example, the process 1400 may include determining 5G V2X capability of a UE based on a message of a network procedure (e.g., any one of the messages described above in connection with FIGS. 2-12, etc.) in a wireless network (e.g., a combination of a 4G and 5G network; a 5GC network, etc.). The process 1400 may also include determining if the UE is authorized to perform 5G V2X operations based on subscription information from HSS; and indicating to a 5G access network (AN) the UE is authorized to perform the 5G V2X operations With regard now to FIG. 15, a schematic illustration of a process 1500 of performing a registration process for V2X communication when a (R)AN 1502 (e.g., an NG RAN, etc.) is accessing a 5GC network is shown. The process 1501 begins at operation 1, where a Registration Request message is sent to the NG RAN 1502 by a UE 1501. In one embodiment, the Registration Request is similar to or the same as any one of the Registration Requests described above in connection with at least one of FIGS. 2-14. Next, at operation 2, the (R)AN 1502 selects an AMF 1503. If UE 1501 is in CM-CONNECTED state, the (R)AN 1502 can forward the Registration Request message to the AMF 1503 based on the N2 connection of the UE 1501. If the (R)AN 1502 cannot select an appropriate AMF 1503, it forwards the Registration Request to an AMF (not shown) that has been configured, in (R)AN 1502, to perform AMF selection. Moving on to operation 3, the (R)AN 1502 communicates with the AMF 1503 by sending the AMF 1503 the Registration Request in an N2 message. In one embodiment, the N2 message contains N2 parameters, the Registration Request, and a UE Policy Container. At operations 4 and 5, communications between the AMF 1503 and the 1504 are conditional. With specific regard to operation 4, the AMF 1503 communicates an Namf_Communication_UEContext-Transfer message to the AMF 1504. In operation 5, the AMF 1504 communicates an Namf_Communication_UEContext-Transfer message to the AMF 1503.

Referring now to operation 6, which is conditional, the AMF 1503 communicates and Identity request message to the UE 1501. The UE 1501 responds, at operation 7, with its identity via an Identity Response message. At operation 8, the AMF 1503 may decide to initiate UE authentication by invoking an Authentication Server Function (AUSF). In that case, the AMF 1503 selects an AUSF. Moving on, at operation 9, if authentication is required, the AMF 1503 requests it from the AUSF; and if Tracing Requirements about the UE 1501 are available at the AMF 1503, the AMF 1503 provides Tracing Requirements in its request to AUSF. With regard to operation 10, the AMF 1503 communicates an Namf_Communication_RegistrationCompleteNotify ( ) message to the AMF 1504. Next, operation 11, which is conditional includes the AMF 1503 exchanging an Identity Request message and Identity Response message with the UE 1501. Operation 12 is optional. This operation includes the AMF 1503 initiating ME identity check by invoking the N5g-eir_EquipmentIdentityCheck_Get service operation. At operation 13, which is conditional on performance of operations 14*a-e*, the AMF 1503 selects a UDM. The UDM may select a UDR instance.

With regard to operations 14*a-c*, if the AMF 1503 has changed since the last Registration procedure, or if the UE 1501 provides a Subscription Permanent Identifier (SUPI) which doesn't refer to a valid context in the AMF, or if the UE registers to the same AMF it has already registered to a non-3GPP access (i.e. the UE 1501 is registered over a non-3GPP access and initiates this Registration procedure to add a 3GPP access), the new AMF 1503 registers with the UDM using Nudm_UECM_Registration for the access to be registered (and subscribes to be notified when the UDM deregisters this AMF). At operation 14*d*, when the UDM stores the associated Access Type (e.g. 3GPP) together with the serving AMF as indicated in step 14a, it will cause the UDM to initiate a Nudm_UECM_DeregistrationNotification (see clause 5.2.3.2.2) to the old AMF 1504 corresponding to the same (e.g. 3GPP) access, if one exists.

Operation 14*e*, which is conditional, allows the old AMF 1504 to unsubscribe with the UDM for subscription data using Nudm_SDM_unsubscribe If the old AMF 1504 does not have UE context for another access type (i.e. non-3GPP access). With regard now to operation 15, if the AMF 1503 decides to initiate policy control function (PCF) communication, the AMF 1503 acts as follows: if the new AMF 1503 decides to use the (V-)PCF identified by (V-)PCF ID included in UE context from the old AMF 1504 in step 5, the AMF 1503 contacts the (V-)PCF identified by the (V-)PCF ID to obtain policy. If the AMF 1503 decides to perform PCF discovery and selection and the AMF 1503 selects a (V-)PCF and may select an H-PCF.

Operation 16 is optional. This operation includes the new AMF 1503 performs an AM Policy Association Establishment/Modification. For an Emergency Registration, this step is skipped. At operation 17, the new AMF 1503 communicates and Nsmf_PDUSession_UpdateSMContext ( ) message to Session Management Function (SMF) 1506. Operation 18, which is conditional, includes the new AMF 1503 communicating an N2 AMF Mobility Request ( ) message to the PCF 1505. Operation 19, which is conditional, includes the PCF 1505 communicating an N2 AMF Mobility Response ( ) message to the AMF 1503. With regard now, to operation 19*a*, which is conditional, the new AMF 1503 registers with the UDM 1508 using Nudm_UECM_Registration as step 14*c*, but with the Access Type set to "non-3GPP access." In operation 19*b*, which is also conditional, the UDM 1508 initiates a Nudm_UECM_DeregistrationNotification to the old AMF 1504 corresponding to the same (i.e. non-3GPP) access when the UDM 1508 stores the associated Access Type (e.g., non-3GPP) together with the serving AMF 1503 described above in connection with operation 19*a*. Moving on, operation 19*c* includes the old AMF 1504 unsubscribing with the UDM 1508 for subscription data using Nudm_SDM_unsubscribe operation.

In one embodiment, the process 1500 includes operation 20. Here, an N2 message is communicated from the AMF 1503 to the (R)AN 1502. This N2 message may, in one embodiment, include an indication that the UE 1501 is authorized to support V2X communication, a UE-PC5-AMBR, and one or more authorized RATs. The process 1500 also includes operation 21, where an attach completed operation is performed. In particular, the (R)AN 1502 forwards the Attach Complete message to the AMF 1503 in a message.

FIG. 16 illustrates an example architecture of a system 1600 including a first CN 1620, in accordance with various embodiments. In this example, system 1600 may implement the LTE standard wherein the CN 1620 is an EPC 1620 that corresponds with CN 120 of FIG. 1. Additionally, the UE 1601 may be the same or similar as the UEs 101 of FIG. 1, and the E-UTRAN 1610 may be a RAN that is the same or similar to the RAN 110 of FIG. 1, and which may include RAN nodes 111 discussed previously. The CN 1620 may comprise MMEs 1621, an S-GW 1622, a Packet Data Network (PDN) Gateway (P-GW) 1623, a home subscriber server (HSS) 1624, and a Serving General Packet Radio Service (GPRS) Support Nodes (SGSN) 1625.

The MMEs 1621 may be similar in function to the control plane of legacy SGSN, and may implement mobility management (MM) functions to keep track of the current location of a UE 1601. The MMEs 1621 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 1601, provide user identity confidentiality, and/or other like services to users/subscribers. Each UE 1601 and the MME 1621 may include an MM or EMM sublayer, and an MM context may be established in the UE 1601 and the MME 1621 when an attach procedure is successfully completed. The MM context may be a data structure or database object that stores MM-related information of the UE 1601. The MMEs 1621 may be coupled with the HSS 1624 via an S6a reference point, coupled with the SGSN 1625 via an S3 reference point, and coupled with the S-GW 1622 via an S11 reference point.

The SGSN 1625 may be a node that serves the UE 1601 by tracking the location of an individual UE 1601 and performing security functions. In addition, the SGSN 1625 may perform Inter-EPC node signaling for mobility between 2G/3G and E-UTRAN 3GPP access networks; PDN and S-GW selection as specified by the MMEs 1621; handling of UE 1601 time zone functions as specified by the MMEs 1621; and MME selection for handovers to E-UTRAN 3GPP access network. The S3 reference point between the MMEs 1621 and the SGSN 1625 may enable user and bearer information exchange for inter-3GPP access network mobility in idle and/or active states.

The HSS 1624 may comprise a database for network users, including subscription-related information to support the network entities' handling of communication sessions. The EPC 1620 may comprise one or several HSSs 1624, depending on the number of mobile subscribers, on the capacity of the equipment, on the organization of the network, etc. For example, the HSS 1624 can provide support for routing/roaming, authentication, authorization, naming/addressing resolution, location dependencies, etc. An S6a reference point between the HHS 1624 and the MMEs 1621 may enable transfer of subscription and authentication data for authenticating/authorizing user access to the EPC 1620 between HHS 1624 and the MMEs 1621.

The S-GW 1622 may terminate the S1 interface 513 ("S1-U" in FIG. 16) towards the RAN 1610, and routes data packets between the RAN 1610 and the EPC 1620. In addition, the S-GW 1622 may be a local mobility anchor point for inter-RAN node handovers and also may provide an anchor for inter-3GPP mobility. Other responsibilities may include lawful intercept, charging, and some policy enforcement. The S11 reference point between the S-GW 1622 and the MMEs 1621 may provide a control plane between the MMEs 1621 and the S-GW 1622. The S-GW 1622 may be coupled with the P-GW 1623 via an S5 reference point.

The P-GW 1623 may terminate an SGi interface toward a Packet Data Network (PDN) 1630. The P-GW 1623 may route data packets between the EPC 1620 and e20ernal networks such as a network including the application server 130 (alternatively referred to as application function (AF)) via an Internet Protocol (IP) interface 125 (see e.g., FIG. 1). In embodiments, the P-GW 1623 may be communicatively coupled to an application server (application server 130 of FIG. 1 or PDN 1630 in FIG. 16) via an IP communications interface 525 (see e.g., FIG. 1). The S5 reference point between the P-GW 1623 and the S-GW 1622 may provide user plane tunneling and tunnel management between the P-GW 1623 and the S-GW 1622. The S5 reference point may also be used for S-GW 1622 relocation due to UE 1601 mobility and if the S-GW 1622 needs to connect to a non-collocated P-GW 1623 for the required PDN connectivity. The P-GW 1623 may further include a node for policy enforcement and charging data collection (e.g., Policy and Charging Enforcement Function (PCEF) (not shown). Additionally, the SGi reference point between the P-GW 1623 and the packet data network (PDN) 1630 may be an operator e20ernal public, a private PDN, or an intra operator packet data network, for example, for provision of IMS services. The P-GW 1623 may be coupled with a PCRF 1626 via a Gx reference point.

Policy and Charging Enforcement Function (PCRF) 1626 is the policy and charging control element of the EPC 1620. In a non-roaming scenario, there may be a single PCRF 1626 in the Home Public Land Mobile Network (HPLMN) associated with an UE's 1601 Internet Protocol Connectivity Access Network (IP-CAN) session. In a roaming scenario with local breakout of traffic, there may be two PCRFs associated with an UE's 1601 IP-CAN session, a Home PCRF (H-PCRF) within a HPLMN and a Visited PCRF (V-PCRF) within a Visited Public Land Mobile Network (VPLMN). The PCRF may be communicatively coupled to the application server 1630 via the P-GW 1623. The application server 1630 may signal the PCRF to indicate a new service flow and select the appropriate Quality of Service (QoS) and charging parameters. The PCRF 1626 may provision this rule into a Policy and Charging Enforcement Function (PCEF) (not shown) with the appropriate traffic flow template (TFT) and QoS class of identifier (QCI), which commences the QoS and charging as specified by the application server 1630. The Gx reference point between the PCRF 1626 and the P-GW 1623 may allow for the transfer of (QoS) policy and charging rules from the PCRF 1626 to Policy and Charging Enforcement Function (PCEF) in the P-GW 1623. An Rx reference point may reside between the PDN 1630 (or "AF 1630") and the PCRF 1626.

Figure 17:
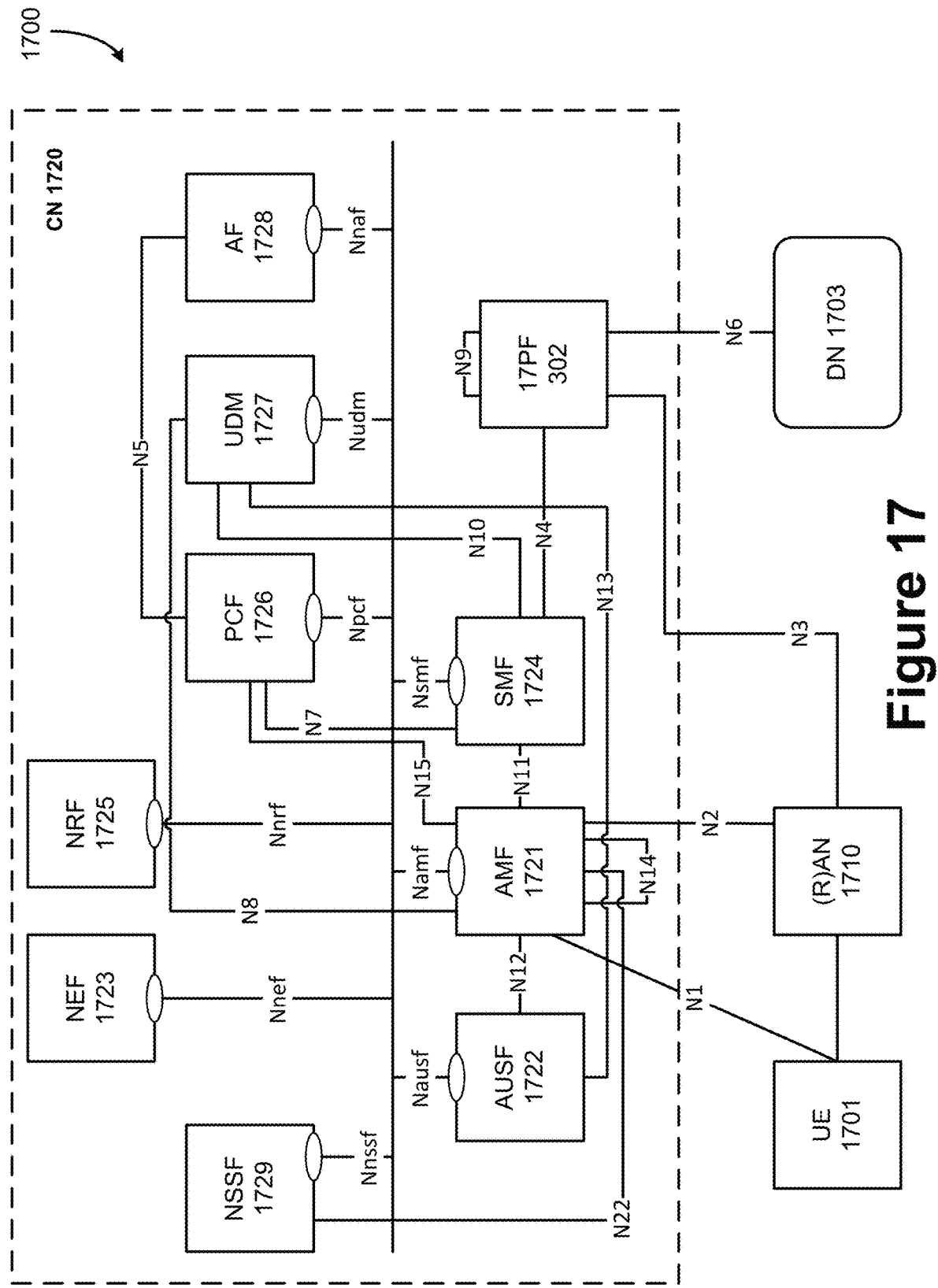
FIG. 17 illustrates an architecture of a system including a second CN in accordance with various embodiments.

FIG. 17 illustrates an architecture of a system 1700 including a second CN 1720 in accordance with various embodiments. The system 1700 is shown to include a UE 1701, which may be the same or similar to the UEs 101 and UE 1601 discussed previously; a (R)AN 1710, which may be the same or similar to the RAN 110 and RAN 1610 discussed previously, and which may include RAN nodes 111 discussed previously; and a Data network (DN) 1703, which may be, for example, operator services, Internet access or 3rd party services; and a 5G Core Network (5GC or CN) 1720.

The 5GC 1720 may include an Authentication Server Function (AUSF) 222; an Access and Mobility Management Function (AMF) 1721; a Session Management Function (SMF) 1724; a Network Exposure Function (NEF) 1723; a Policy Control function (PCF) 1726; a Network Function (NF) Repository Function (NRF) 1725; a Unified Data Management (UDM) 1727; an Application Function (AF) 1728; a User Plane Function (UPF) 1702; and a Network Slice Selection Function (NSSF) 1729.

The UPF 1702 may act as an anchor point for intra-RAT and inter-RAT mobility, an e20ernal PDU session point of interconnect to DN 1703, and a branching point to support multi-homed PDU session. The UPF 1702 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 1702 may include an uplink classifier to support routing traffic flows to a data network. The DN 1703 may represent various network operator services, Internet access, or third party services. DN 1703 may include, or be similar to application server 130 discussed previously. The UPF 1702 may interact with the SMF 1724 via an N4 reference point between the SMF 1724 and the UPF 1702.

The AUSF 1722 may store data for authentication of UE 1701 and handle authentication related functionality. The AUSF 1722 may facilitate a common authentication framework for various access types. The AUSF 1722 may communicate with the AMF 1721 via an N12 reference point between the AMF 1721 and the AUSF 1722; and may communicate with the UDM 1727 via an N13 reference point between the UDM 1727 and the AUSF 1722. Additionally, the AUSF 1722 may exhibit an Nausf service-based interface.

The AMF 1721 may be responsible for registration management (e.g., for registering UE 1701, etc.), connection management, reachability management, mobility management, and lawful interception of AMF-related events, and access authentication and authorization. The AMF 1721 may be a termination point for the an N11 reference point between the AMF 1721 and the SMF 1724. The AMF 1721 may provide transport for Session Management (SM) messages between the UE 1701 and the SMF 1724, and act as a transparent proxy for routing SM messages. AMF 1721 may also provide transport for short message service (SMS) messages between UE 1701 and an SMS function (SMSF) (not shown by FIG. 17). AMF 1721 may act as Security Anchor Function (SEA), which may include interaction with the AUSF 1722 and the UE 1701, receipt of an intermediate key that was established as a result of the UE 1701 authentication process. Where USIM based authentication is used, the AMF 1721 may retrieve the security material from the AUSF 1722. AMF 1721 may also include a Security Context Management (SCM) function, which receives a key from the SEA that it uses to derive access-network specific keys. Furthermore, AMF 1721 may be a termination point of RAN CP interface, which may include or be an N2 reference point between the (R)AN 1711 and the AMF 1721; and the AMF 1721 may be a termination point of NAS (N1) signalling, and perform NAS ciphering and integrity protection.

AMF 1721 may also support NAS signalling with a UE 1701 over an N3 interworking-function (IWF) interface. The N3IWF may be used to provide access to untrusted entities. N3IWF may be a termination point for the N2 interface between the (R)AN 1710 and the AMF 1721 for the control plane, and may be a termination point for the N3 reference point between the (R)AN 1710 and the UPF 1702 for the user plane. As such, the AMF 1721 may handle N2 signalling from the SMF 1724 and the AMF 1721 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 1701 and AMF 1721 via an N1 reference point between the UE 1701 and the AMF 1721, and relay uplink and downlink user-plane packets between the UE 1701 and UPF 1702. The N3IWF also provides mechanisms for IPsec tunnel establishment with the UE 1701. The AMF 1721 may exhibit an Namf service-based interface, and may be a termination point for an N14 reference point between two AMFs 1721 and an N17 reference point between the AMF 1721 and a 5G-Equipment Identity Register (5G-EIR) (not shown by FIG. 17).

The UE 1701 may need to register with the AMF 1721 in order to receive network services. Registration Management (RM) is used to register or deregister the UE 1701 with the network (e.g., AMF 1721), and establish a UE context in the network (e.g., AMF 1721). The UE 1701 may operate in an RM-REGISTERED state or an RM-DEREGISTERED state. In the RM-DEREGISTERED state, the UE 1701 is not registered with the network, and the UE context in AMF 1721 holds no valid location or routing information for the UE 1701 so the UE 1701 is not reachable by the AMF 1721. In the RM-REGISTERED state, the UE 1701 is registered with the network, and the UE context in AMF 1721 may hold a valid location or routing information for the UE 1701 so the UE 1701 is reachable by the AMF 1721. In the RM-REGISTERED state, the UE 1701 may perform mobility Registration Update procedures, perform periodic Registration Update procedure triggered by expiration of the periodic update timer (e.g., to notify the network that the UE 1701 is still active), and perform a Registration Update procedure to update UE capability information or to re-negotiate protocol parameters with the network, among others.

The AMF 1721 may store one or more RM contexts for the UE 1701, where each RM context is associated with a specific access to the network. The RM context may be a data structure, database object, etc. that indicates or stores, inter alia, a registration state per access type and the periodic update timer. The AMF 1721 may also store a 5GC MM context that may be the same or similar to the (E)MM context discussed previously. In various embodiments, the AMF 1721 may store a CE mode B Restriction parameter of the UE 1701 in an associated MM context or RM context. The AMF 1721 may also derive the value, when needed, from the UE's usage setting parameter already stored in the UE context (and/or MM/RM Context).

Connection Management (CM) may be used to establish and release a signaling connection between the UE 1701 and the AMF 1721 over the N1 interface. The signaling connection is used to enable NAS signaling exchange between the UE 1701 and the CN 120, and comprises both the AN signaling connection between the UE and the Access Network (AN) (e.g., RRC connection or UE-N3IWF connection for Non-3GPP access) and the N2 connection for the UE 1701 between the AN (e.g., RAN 1710) and the AMF 1721. The UE 1701 may operate in one of two CM states, CM-IDLE mode or CM-CONNECTED mode. When the UE 1701 is operating in the CM-IDLE state/mode, the UE 1701 may have no NAS signaling connection established with the AMF 1721 over the N1 interface, and there may be (R)AN 1710 signaling connection (e.g., N2 and/or N3 connections) for the UE 1701. When the UE 1701 is operating in the CM-CONNECTED state/mode, the UE 1701 may have an established NAS signaling connection with the AMF 1721 over the N1 interface, and there may be a (R)AN 1710 signaling connection (e.g., N2 and/or N3 connections) for the UE 1701. Establishment of an N2 connection between the (R)AN 1710 and the AMF 1721 may cause the UE 1701 to transition from CM-IDLE mode to CM-CONNECTED mode, and the UE 1701 may transition from the CM-CONNECTED mode to the CM-IDLE mode when N2 signaling between the (R)AN 1710 and the AMF 1721 is released.

The SMF 1724 may be responsible for Session Management (SM) (e.g., session establishment, modify and release, including tunnel maintain between UPF and AN node); UE IP address allocation & management (including optional Authorization); selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. SM may refer to management of a PDU session, and a PDU session or "session" may refer to a PDU Connectivity Service that provides or enables the exchange of PDUs between a UE 1701 and a data network (DN) 1703 identified by a Data Network Name (DNN). PDU Sessions may be established upon UE 1701 request, modified upon UE 1701 and 5GC 1720 request, and released upon UE 1701 and 5GC 1720 request using NAS SM signaling exchanged over the N1 reference point between the UE 1701 and the SMF 1724. Upon request from an Application Server, the 5GC 1720 may trigger a specific application in the UE 1701. In response to receipt of the trigger message, the UE 1701 may pass the trigger message (or relevant parts/information of the trigger message) to one or more identified applications in the UE 1701. The identified application(s) in the UE 1701 may establish a PDU Session to a specific DNN. The SMF 1724 may check whether the UE 1701 requests are compliant with user subscription information associated with the UE 1701. In this regard, the SMF 1724 may retrieve and/or request to receive update notifications on SMF 1724 level subscription data from the UDM 1727.

The SMF 1724 may include the following roaming functionality: handle local enforcement to apply QoS SLAB (VPLMN); charging data collection and charging interface (VPLMN); lawful intercept (in VPLMN for SM events and interface to LI System); support for interaction with e20ernal DN for transport of signalling for PDU session authorization/authentication by e20ernal DN. An N16 reference point between two SMFs 1724 may be included in the system 1700, which may be between another SMF 1724 in a visited network and the SMF 1724 in the home network in roaming scenarios. Additionally, the SMF 1724 may exhibit the Nsmf service-based interface.

The NEF 1723 may provide means for securely exposing the services and capabilities provided by 3GPP network functions for third party, internal exposure/re-exposure, Application Functions (e.g., AF 1728), edge computing or fog computing systems, etc. In such embodiments, the NEF 1723 may authenticate, authorize, and/or throttle the AFs. NEF 1723 may also translate information exchanged with the AF 1728 and information exchanged with internal network functions. For example, the NEF 1723 may translate between an AF-Service-Identifier and an internal 5GC information. NEF 1723 may also receive information from other network functions (NFs) based on exposed capabilities of other network functions. This information may be stored at the NEF 1723 as structured data, or at a data storage NF using a standardized interfaces. The stored information can then be re-exposed by the NEF 1723 to other NFs and AFs, and/or used for other purposes such as analytics. Additionally, the NEF 1723 may exhibit an Nnef service-based interface.

The NRF 1725 may support service discovery functions, receive NF Discovery Requests from NF instances, and provide the information of the discovered NF instances to the NF instances. NRF 1725 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 1725 may exhibit the Nnrf service-based interface.

The PCF 1726 may provide policy rules to control plane function(s) to enforce them, and may also support unified policy framework to govern network behaviour. The PCF 1726 may also implement a front end (FE) to access subscription information relevant for policy decisions in a UDR of the UDM 1727. The PCF 1726 may communicate with the AMF 1721 via an N15 reference point between the PCF 1726 and the AMF 1721, which may include a PCF 1726 in a visited network and the AMF 1721 in case of roaming scenarios. The PCF 1726 may communicate with the AF 1728 via an N5 reference point between the PCF 1726 and the AF 1728; and with the SMF 1724 via an N7 reference point between the PCF 1726 and the SMF 1724. The system 200 and/or CN 120 may also include an N24 reference point between the PCF 1726 (in the home network) and a PCF 1726 in a visited network. Additionally, the PCF 1726 may exhibit an Npcf service-based interface.

The UDM 1727 may handle subscription-related information to support the network entities' handling of communication sessions, and may store subscription data of UE 1701. For example, subscription data may be communicated between the UDM 1727 and the AMF 1721 via an N8 reference point between the UDM 1727 and the AMF 1721 (not shown by FIG. 17). The UDM 1727 may include two parts, an application FE and a User Data Repository (UDR) (the FE and UDR are not shown by FIG. 17). The UDR may store subscription data and policy data for the UDM 1727 and the PCF 1726, and/or structured data for exposure and application data (including Packet Flow Descriptions (PFDs) for application detection, application request information for multiple UEs 201) for the NEF 1723. The Nudr service-based interface may be exhibited by the UDR 221 to allow the UDM 1727, PCF 1726, and NEF 1723 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 1724 via an N10 reference point between the UDM 1727 and the SMF 1724. UDM 1727 may also support SMS management, wherein an SMS-FE implements the similar application logic as discussed previously. Additionally, the UDM 1727 may exhibit the Nudm service-based interface.

The AF 1728 may provide application influence on traffic routing, access to the Network Capability Exposure (NCE), and interact with the policy framework for policy control. The NCE may be a mechanism that allows the 5GC 1720 and AF 1728 to provide information to each other via NEF 1723, which may be used for edge computing implementations. In such implementations, the network operator and third party services may be hosted close to the UE 1701 access point of attachment to achieve an efficient service delivery through the reduced end-to-end latency and load on the transport network. For edge computing implementations, the 5GC may select a UPF 1702 close to the UE 1701 and execute traffic steering from the UPF 1702 to DN 1703 via the N6 interface. This may be based on the UE subscription data, UE location, and information provided by the AF 1728. In this way, the AF 1728 may influence UPF (re)selection and traffic routing. Based on operator deployment, when AF 1728 is considered to be a trusted entity, the network operator may permit AF 1728 to interact directly with relevant NFs. Additionally, the AF 1728 may exhibit an Naf service-based interface.

The NSSF 1729 may select a set of network slice instances serving the UE 1701. The NSSF 1729 may also determine allowed Network Slice Selection Assistance Information (NSSAI) and the mapping to the Subscribed Single-NSSAIs (S-NSSAIs), if needed. The NSSF 1729 may also determine the AMF set to be used to serve the UE 1701, or a list of candidate AMF(s) 221 based on a suitable configuration and possibly by querying the NRF 1725. The selection of a set of network slice instances for the UE 1701 may be triggered by the AMF 1721 with which the UE 1701 is registered by interacting with the NSSF 1729, which may lead to a change of AMF 1721. The NSSF 1729 may interact with the AMF 1721 via an N22 reference point between AMF 1721 and NSSF 1729; and may communicate with another NSSF 1729 in a visited network via an N31 reference point (not shown by FIG. 17). Additionally, the NSSF 1729 may exhibit an Nnssf service-based interface.

As discussed previously, the CN 1720 may include an SMSF, which may be responsible for SMS subscription checking and verification, and relaying SM messages to/from the UE 1701 to/from other entities, such as an SMS-GMSC/IWMSC/SMS-router. The SMS may also interact with AMF 1721 and UDM 1727 for notification procedure that the UE 1701 is available for SMS transfer (e.g., set a UE not reachable flag, and notifying UDM 1727 when UE 1701 is available for SMS).

The CN 120 may also include other elements that are not shown by FIG. 17, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 17). Individual NFs may share a UDSF for storing their respective unstructured data or individual NFs may each have their own UDSF located at or near the individual NFs. Additionally, the UDSF may exhibit an Nudsf service-based interface (not shown by FIG. 17). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 17 for clarity. In one example, the CN 1720 may include an Nx interface, which is an inter-CN interface between the MME (e.g., MME 1621) and the AMF 1721 in order to enable interworking between CN 1720 and CN 1620. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

Figure 18:
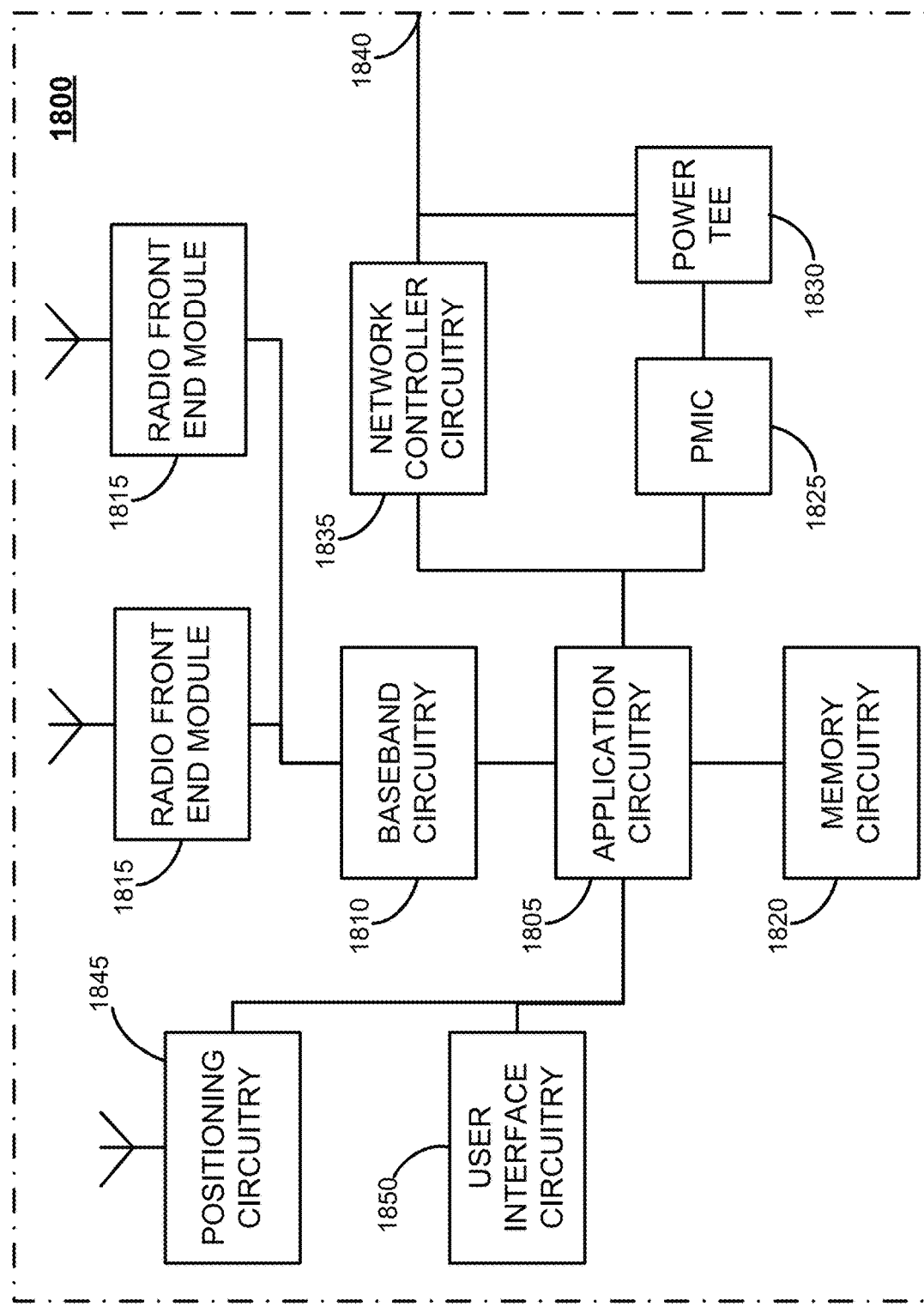
FIG. 18 illustrates an example of infrastructure equipment in accordance with various embodiments.

FIG. 18 illustrates an example of infrastructure equipment 1800 in accordance with various embodiments. The infrastructure equipment 1800 (or "system 1800") may be implemented as a base station, radio head, RAN node, etc., such as the RAN nodes 111 and/or AP 106 shown and described previously. In other examples, the system 1800 could be implemented in or by a UE, application server(s) 130, and/or any other element/device discussed herein. The system 1800 may include one or more of application circuitry 1805, baseband circuitry 1810, one or more radio front end modules 1815, memory 1820, power management integrated circuitry (PMIC) 1825, power tee circuitry 1830, network controller 1835, network interface connector 1840, satellite positioning circuitry 1845, and user interface 1850. In some embodiments, the device 1800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 120 (or CN 170 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 1805 may include one or more central processing unit (CPU) cores and one or more of cache memory, low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 1805 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 1800 may not utilize application circuitry 1805, and instead may include a special-purpose processor/controller to process IP data received from an EPC or 5GC, for example.

Additionally or alternatively, application circuitry 1805 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1805 may comprise logic blocks or logic fabric including and other interconnected resources that may be programmed to perform various functions, such as the procedures, methods, functions, etc. of the various embodiments discussed herein. In such embodiments, the circuitry of application circuitry 1805 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 1810 may be implemented, for example, as a solder-down substrate including one or more integrated circuits, a single packaged integrated circuit soldered to a main circuit board or a multi-chip module containing two or more integrated circuits. Although not shown, baseband circuitry 1810 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1810 may include protocol processing circuitry with one or more instances of control circuitry (not shown) to provide control functions for the digital baseband circuitry and/or radio frequency circuitry (e.g., the radio front end modules 1815).

User interface circuitry 1850 may include one or more user interfaces designed to enable user interaction with the system 1800 or peripheral component interfaces designed to enable peripheral component interaction with the system 1800. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 1815 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 1815. The RFEMs 1815 may incorporate both millimeter wave antennas and sub-millimeter wave antennas.

The memory circuitry 1820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1820 may be implemented as one or more of solder down packaged integrated circuits, socketed memory modules and plug-in memory cards.

The PMIC 1825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1830 may provide for electrical power drawn from a network cable to provide both power supply and data connectivity to the infrastructure equipment 1800 using a single cable.

The network controller circuitry 1835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1800 via network interface connector 1840 using a physical connection, which may be electrical (commonly referred to as a "copper interconnect"), optical, or wireless. The network controller circuitry 1835 may include one or more dedicated processors and/or FPGAs to communicate using one or more of the aforementioned protocols. In some implementations, the network controller circuitry 1835 may include multiple controllers to provide connectivity to other networks using the same or different protocols.

The positioning circuitry 1845, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1845 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 1845 and/or positioning circuitry implemented by UEs 101, 102, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 1845 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 1845 may provide data to application circuitry 1805 which may include one or more of position data or time data. Application circuitry 1805 may use the time data to synchronize operations with other radio base stations (e.g., RAN nodes 111 or the like).

The components shown by FIG. 18 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I²C interface, an SPI interface, point to point interfaces, and a power bus, among others.

Figure 19:
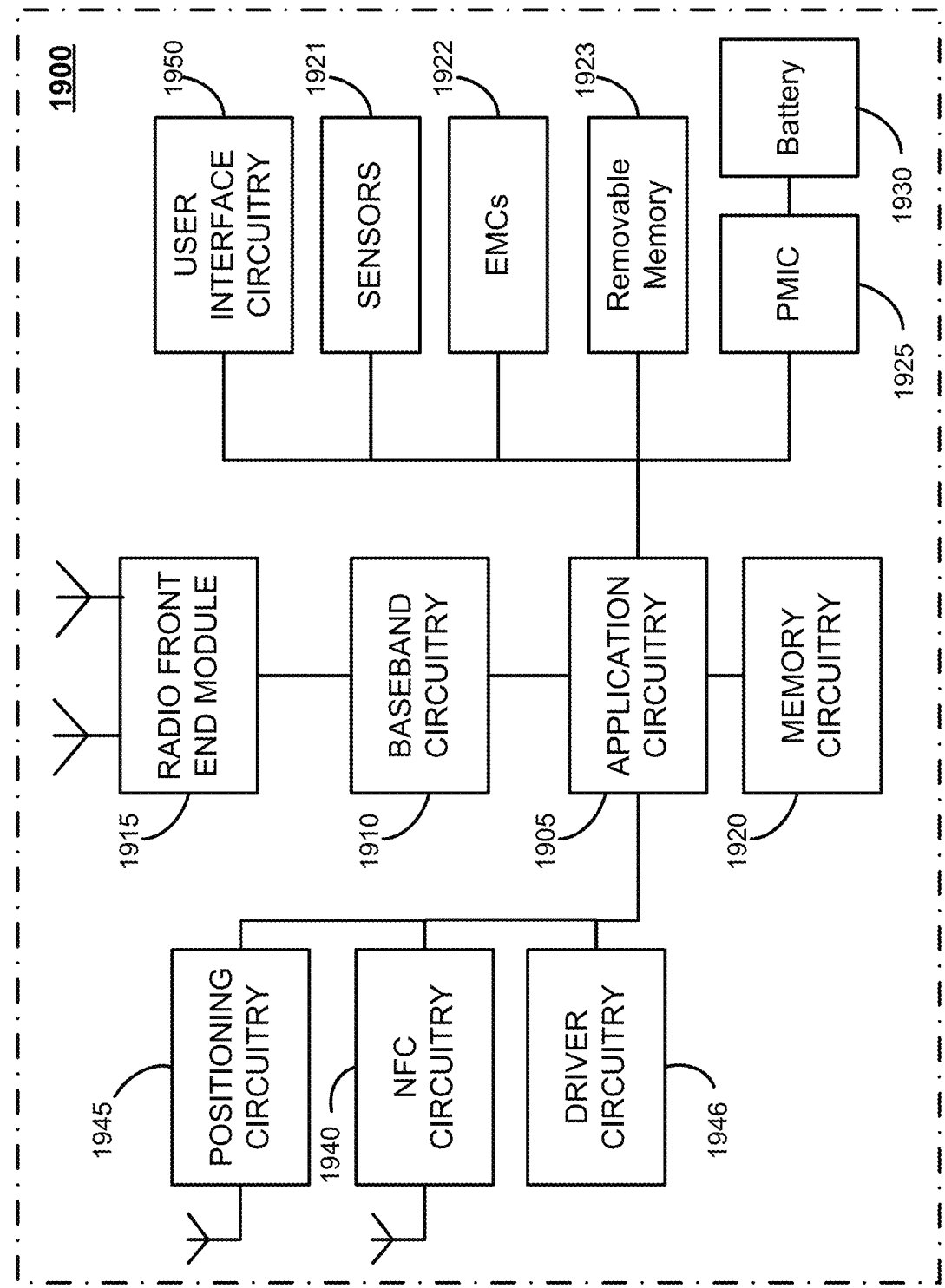
FIG. 19 illustrates an example of a platform (or "device") in accordance with various embodiments.

FIG. 19 illustrates an example of a platform 1900 (or "device 1900") in accordance with various embodiments. In embodiments, the computer platform 1900 may be suitable for use as UEs 101, 102, XR01, application servers 130, and/or any other element/device discussed herein. The platform 1900 may include any combinations of the components shown in the example. The components of platform 1900 may be implemented as integrated circuits (ICs), portions thereof, discrete electronic devices, or other modules, logic, hardware, software, firmware, or a combination thereof adapted in the computer platform 1900, or as components otherwise incorporated within a chassis of a larger system. The block diagram of FIG. 19 is intended to show a high level view of components of the computer platform 1900. However, some of the components shown may be omitted, additional components may be present, and different arrangement of the components shown may occur in other implementations.

The application circuitry 1905 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 1900. In some embodiments, processors of application circuitry 1805/1905 may process IP data packets received from an EPC or 5GC.

Application circuitry 1905 be or include a microprocessor, a multi-core processor, a multithreaded processor, an ultra-low voltage processor, an embedded processor, or other known processing element. In one example, the application circuitry 1905 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 1905 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 1905 may be a part of a system on a chip (SoC) in which the application circuitry 1905 and other components are formed into a single integrated circuit, or a single package, such as the Edison™ or Galileo™ SoC boards from Intel® Corporation.

Additionally or alternatively, application circuitry 1905 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1905 may comprise logic blocks or logic fabric including and other interconnected resources that may be programmed to perform various functions, such as the procedures, methods, functions, etc. of the various embodiments discussed herein. In such embodiments, the circuitry of application circuitry 1905 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 1910 may be implemented, for example, as a solder-down substrate including one or more integrated circuits, a single packaged integrated circuit soldered to a main circuit board or a multi-chip module containing two or more integrated circuits. Although not shown, baseband circuitry 1910 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1910 may include protocol processing circuitry with one or more instances of control circuitry (not shown) to provide control functions for the digital baseband circuitry and/or radio frequency circuitry (e.g., the radio front end modules 1915).

The radio front end modules (RFEMs) 1915 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 1915. The RFEMs 1915 may incorporate both millimeter wave antennas and sub-millimeter wave antennas.

The memory circuitry 1920 may include any number and type of memory devices used to provide for a given amount of system memory. As examples, the memory circuitry 1920 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1920 may be developed in accordance with a Joint Electron Devices Engineering Council (JEDEC) low power double data rate (LPDDR)-based design, such as LPDDR2, LPDDR3, LPDDR4, or the like. Memory circuitry 1920 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1920 may be on-die memory or registers associated with the application circuitry 1905. To provide for persistent storage of information such as data, applications, operating systems and so forth, memory circuitry 1920 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1900 may incorporate the three-dimensional (3D) cross-point (XPOINT) memories from Intel® and Micron®.

Removable memory circuitry 1923 may include devices, circuitry, enclosures/housings, ports or receptacles, etc. used to coupled portable data storage devices with the platform 1900. These portable data storage devices may be used for mass storage purposes, and may include, for example, flash memory cards (e.g., Secure Digital (SD) cards, microSD cards, xD picture cards, and the like), and USB flash drives, optical discs, e20ernal HDDs, and the like.

The platform 1900 may also include interface circuitry (not shown) that is used to connect e20ernal devices with the platform 1900. The e20ernal devices connected to the platform 1900 via the interface circuitry may include sensors 1921, such as accelerometers, level sensors, flow sensors, temperature sensors, pressure sensors, barometric pressure sensors, and the like. The interface circuitry may be used to connect the platform 1900 to electro-mechanical components (EMCs) 1922, which may allow platform 1900 to change its state, position, and/or orientation, or move or control a mechanism or system. The EMCs 1922 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1900 may be configured to operate one or more EMCs 1922 based on one or more captured events and/or instructions or control signals received from a service provider and/or various clients.

In some implementations, the interface circuitry may connect the platform 1900 with positioning circuitry 1945, which may be the same or similar as the positioning circuitry 1845 discussed with regard to FIG. 18.

In some implementations, the interface circuitry may connect the platform 1900 with near-field communication (NFC) circuitry 1940, which may include an NFC controller coupled with an antenna element and a processing device. The NFC circuitry 1940 may be configured to read electronic tags and/or connect with another NFC-enabled device.

The driver circuitry 1946 may include software and hardware elements that operate to control particular devices that are embedded in the platform 1900, attached to the platform 1900, or otherwise communicatively coupled with the platform 1900. The driver circuitry 1946 may include individual drivers allowing other components of the platform 1900 to interact or control various input/output (I/O) devices that may be present within, or connected to, the platform 1900. For example, driver circuitry 1946 may include a display driver to control and allow access to a display device, a touchscreen driver to control and allow access to a touchscreen interface of the platform 1900, sensor drivers to obtain sensor readings of sensors 1921 and control and allow access to sensors 1921, EMC drivers to obtain actuator positions of the EMCs 1922 and/or control and allow access to the EMCs 1922, a camera driver to control and allow access to an embedded image capture device, audio drivers to control and allow access to one or more audio devices.

The power management integrated circuitry (PMIC) 1925 (also referred to as "power management circuitry 1925") may manage power provided to various components of the platform 1900. In particular, with respect to the baseband circuitry 1910, the PMIC 1925 may control power-source selection, voltage scaling, battery charging, or DC-to-DC conversion. The PMIC 1925 may often be included when the platform 1900 is capable of being powered by a battery 1930, for example, when the device is included in a UE 101, 102, XR01.

In some embodiments, the PMIC 1925 may control, or otherwise be part of, various power saving mechanisms of the platform 1900. For example, if the platform 1900 is in an RRC_Connected state, where it is still connected to the RAN node as it expects to receive traffic shortly, then it may enter a state known as Discontinuous Reception Mode (DRX) after a period of inactivity. During this state, the platform 1900 may power down for brief intervals of time and thus save power. If there is no data traffic activity for an extended period of time, then the platform 1900 may transition off to an RRC_Idle state, where it disconnects from the network and does not perform operations such as channel quality feedback, handover, etc. The platform 1900 goes into a very low power state and it performs paging where again it periodically wakes up to listen to the network and then powers down again. The platform 1900 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1930 may power the platform 1900, although in some examples the platform 1900 may be mounted deployed in a fixed location, and may have a power supply coupled to an electrical grid. The battery 1930 may be a lithium ion battery, a metal-air battery, such as a zinc-air battery, an aluminum-air battery, a lithium-air battery, and the like. In some implementations, such as in V2X applications, the battery 1930 may be a typical lead-acid automotive battery.

In some implementations, the battery 1930 may be a "smart battery," which includes or is coupled with a Battery Management System (BMS) or battery monitoring integrated circuitry. The BMS may be included in the platform 1900 to track the state of charge (SoCh) of the battery 1930. The BMS may be used to monitor other parameters of the battery 1930 to provide failure predictions, such as the state of health (SoH) and the state of function (SoF) of the battery 1930. The BMS may communicate the information of the battery 1930 to the application circuitry 1905 or other components of the platform 1900. The BMS may also include an analog-to-digital (ADC) convertor that allows the application circuitry 1905 to directly monitor the voltage of the battery 1930 or the current flow from the battery 1930. The battery parameters may be used to determine actions that the platform 1900 may perform, such as transmission frequency, network operation, sensing frequency, and the like.

A power block, or other power supply coupled to an electrical grid may be coupled with the BMS to charge the battery 1930. In some examples, the power block 128 may be replaced with a wireless power receiver to obtain the power wirelessly, for example, through a loop antenna in the computer platform 1900. In these examples, a wireless battery charging circuit may be included in the BMS. The specific charging circuits chosen may depend on the size of the battery 1930, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 1900 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I²C interface, an SPI interface, point to point interfaces, and a power bus, among others.

Figure 20:
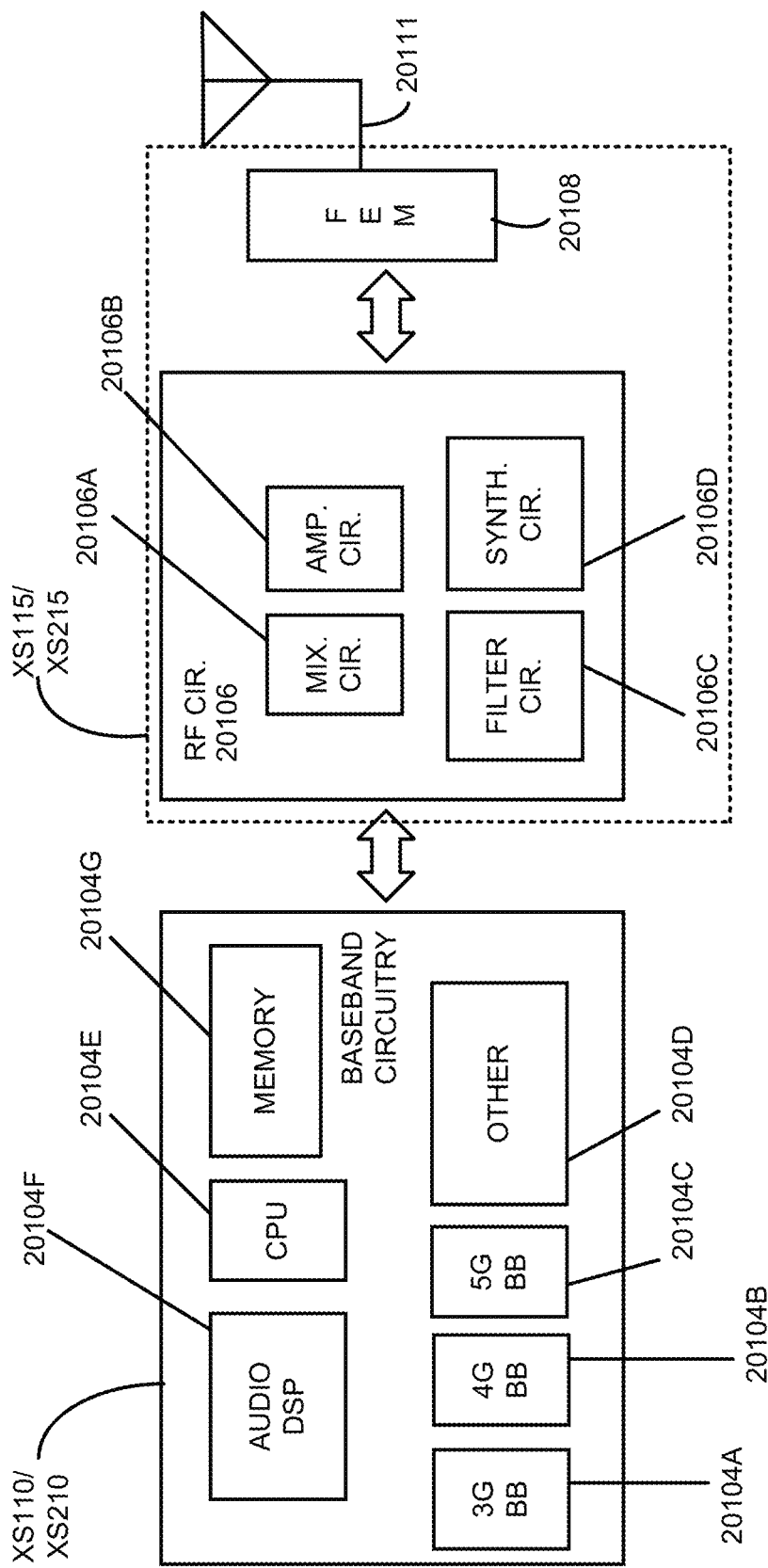
FIG. 20 illustrates example components of baseband circuitry and radio front-end modules (RFEM) in accordance with various embodiments.

FIG. 20 illustrates example components of baseband circuitry 1810/1910 and radio front end modules (RFEM) 1815/1915 in accordance with various embodiments. As shown, the RFEM 1815/1915 may include Radio Frequency (RF) circuitry 20106, front-end module (FEM) circuitry 20108, one or more antennas 20111 coupled together at least as shown.

The baseband circuitry 1810/1910 may include circuitry such as, but not limited to, one or more single-core or multi-core processors. The baseband circuitry 1810/1910 may include one or more baseband processors or control logic to process baseband signals received from a receive signal path of the RF circuitry 20106 and to generate baseband signals for a transmit signal path of the RF circuitry 20106. Baseband processing circuitry 1810/1910 may interface with the application circuitry 1805/1905 for generation and processing of the baseband signals and for controlling operations of the RF circuitry 20106. For example, in some embodiments, the baseband circuitry 1810/1910 may include a third generation (3G) baseband processor 20104A, a fourth generation (4G) baseband processor 20104B, a fifth generation (5G) baseband processor 20104C, or other baseband processor(s) 20104D for other existing generations, generations in development or to be developed in the future (e.g., second generation (2G), si20h generation (6G), etc.). The baseband circuitry 1810/1910 (e.g., one or more of baseband processors 20104A-D) may handle various radio control functions that enable communication with one or more radio networks via the RF circuitry 20106. In other embodiments, some or all of the functionality of baseband processors 20104A-D may be included in modules stored in the memory 20104G and executed via a Central Processing Unit (CPU) 20104E. The radio control functions may include, but are not limited to, signal modulation/demodulation, encoding/decoding, radio frequency shifting, etc. In some embodiments, modulation/demodulation circuitry of the baseband circuitry 1810/1910 may include Fast-Fourier Transform (FFT), precoding, or constellation mapping/demapping functionality. In some embodiments, encoding/decoding circuitry of the baseband circuitry 1810/1910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1810/1910 may include one or more audio digital signal processor(s) (DSP) 20104F. The audio DSP(s) 20104F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1810/1910 and the application circuitry 1805/1905 may be implemented together such as, for example, on a system on a chip (SOC).

In some embodiments, the baseband circuitry 1810/1910 may provide for communication compatible with one or more radio technologies. For example, in some embodiments, the baseband circuitry 1810/1910 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1810/1910 is configured to support radio communications of more than one wireless protocol may be referred to as multi-mode baseband circuitry.

RF circuitry 20106 may enable communication with wireless networks using modulated electromagnetic radiation through a non-solid medium. In various embodiments, the RF circuitry 20106 may include switches, filters, amplifiers, etc. to facilitate the communication with the wireless network. RF circuitry 20106 may include a receive signal path which may include circuitry to down-convert RF signals received from the FEM circuitry 20108 and provide baseband signals to the baseband circuitry 1810/1910. RF circuitry 20106 may also include a transmit signal path which may include circuitry to up-convert baseband signals provided by the baseband circuitry 1810/1910 and provide RF output signals to the FEM circuitry 20108 for transmission.

In some embodiments, the receive signal path of the RF circuitry 20106 may include mixer circuitry 20106a, amplifier circuitry 20106b and filter circuitry 20106c. In some embodiments, the transmit signal path of the RF circuitry 20106 may include filter circuitry 20106c and mixer circuitry 20106a. RF circuitry 20106 may also include synthesizer circuitry 20106d for synthesizing a frequency for use by the mixer circuitry 20106a of the receive signal path and the transmit signal path. In some embodiments, the mixer circuitry 20106a of the receive signal path may be configured to down-convert RF signals received from the FEM circuitry 20108 based on the synthesized frequency provided by synthesizer circuitry 20106d. The amplifier circuitry 20106b may be configured to amplify the down-converted signals and the filter circuitry 20106c may be a low-pass filter (LPF) or band-pass filter (BPF) configured to remove unwanted signals from the down-converted signals to generate output baseband signals. Output baseband signals may be provided to the baseband circuitry 1810/1910 for further processing. In some embodiments, the output baseband signals may be zero-frequency baseband signals, although this is not a requirement. In some embodiments, mixer circuitry 20106a of the receive signal path may comprise passive mixers, although the scope of the embodiments is not limited in this respect.

In some embodiments, the mixer circuitry 20106a of the transmit signal path may be configured to up-convert input baseband signals based on the synthesized frequency provided by the synthesizer circuitry 20106d to generate RF output signals for the FEM circuitry 20108. The baseband signals may be provided by the baseband circuitry 1810/1910 and may be filtered by filter circuitry 20106c.

In some embodiments, the mixer circuitry 20106a of the receive signal path and the mixer circuitry 20106a of the transmit signal path may include two or more mixers and may be arranged for quadrature downconversion and upconversion, respectively. In some embodiments, the mixer circuitry 20106a of the receive signal path and the mixer circuitry 20106a of the transmit signal path may include two or more mixers and may be arranged for image rejection (e.g., Hartley image rejection). In some embodiments, the mixer circuitry 20106a of the receive signal path and the mixer circuitry 20106a may be arranged for direct downconversion and direct upconversion, respectively. In some embodiments, the mixer circuitry 20106a of the receive signal path and the mixer circuitry 20106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 20106 may include analog-to-digital converter (ADC) and digital-to-analog converter (DAC) circuitry and the baseband circuitry 1810/1910 may include a digital baseband interface to communicate with the RF circuitry 20106.

In some dual-mode embodiments, a separate radio IC circuitry may be provided for processing signals for each spectrum, although the scope of the embodiments is not limited in this respect.

In some embodiments, the synthesizer circuitry 20106d may be a fractional-N synthesizer or a fractional N/N+1 synthesizer, although the scope of the embodiments is not limited in this respect as other types of frequency synthesizers may be suitable. For example, synthesizer circuitry 20106d may be a delta-sigma synthesizer, a frequency multiplier, or a synthesizer comprising a phase-locked loop with a frequency divider.

The synthesizer circuitry 20106d may be configured to synthesize an output frequency for use by the mixer circuitry 20106a of the RF circuitry 20106 based on a frequency input and a divider control input. In some embodiments, the synthesizer circuitry 20106d may be a fractional N/N+1 synthesizer.

In some embodiments, frequency input may be provided by a voltage controlled oscillator (VCO), although that is not a requirement. Divider control input may be provided by either the baseband circuitry 1810/1910 or the applications processor 1805/1905 depending on the desired output frequency. In some embodiments, a divider control input (e.g., N) may be determined from a look-up table based on a channel indicated by the applications processor 1805/1905.

Synthesizer circuitry 20106d of the RF circuitry 20106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 20106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 20106 may include an IQ/polar converter.

FEM circuitry 20108 may include a receive signal path which may include circuitry configured to operate on RF signals received from one or more antennas 20111, amplify the received signals and provide the amplified versions of the received signals to the RF circuitry 20106 for further processing. FEM circuitry 20108 may also include a transmit signal path which may include circuitry configured to amplify signals for transmission provided by the RF circuitry 20106 for transmission by one or more of the one or more antennas 20111. In various embodiments, the amplification through the transmit or receive signal paths may be done solely in the RF circuitry 20106, solely in the FEM 20108, or in both the RF circuitry 20106 and the FEM 20108.

In some embodiments, the FEM circuitry 20108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 20106). The transmit signal path of the FEM circuitry 20108 may include a power amplifier (PA) to amplify input RF signals (e.g., provided by RF circuitry 20106), and one or more filters to generate RF signals for subsequent transmission (e.g., by one or more of the one or more antennas 20111).

Processors of the application circuitry 1805/1905 and processors of the baseband circuitry 1810/1910 may be used to execute elements of one or more instances of a protocol stack. For example, processors of the baseband circuitry 1810/1910, alone or in combination, may be used execute Layer 3, Layer 2, or Layer 1 functionality, while processors of the baseband circuitry 1810/1910 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 21:
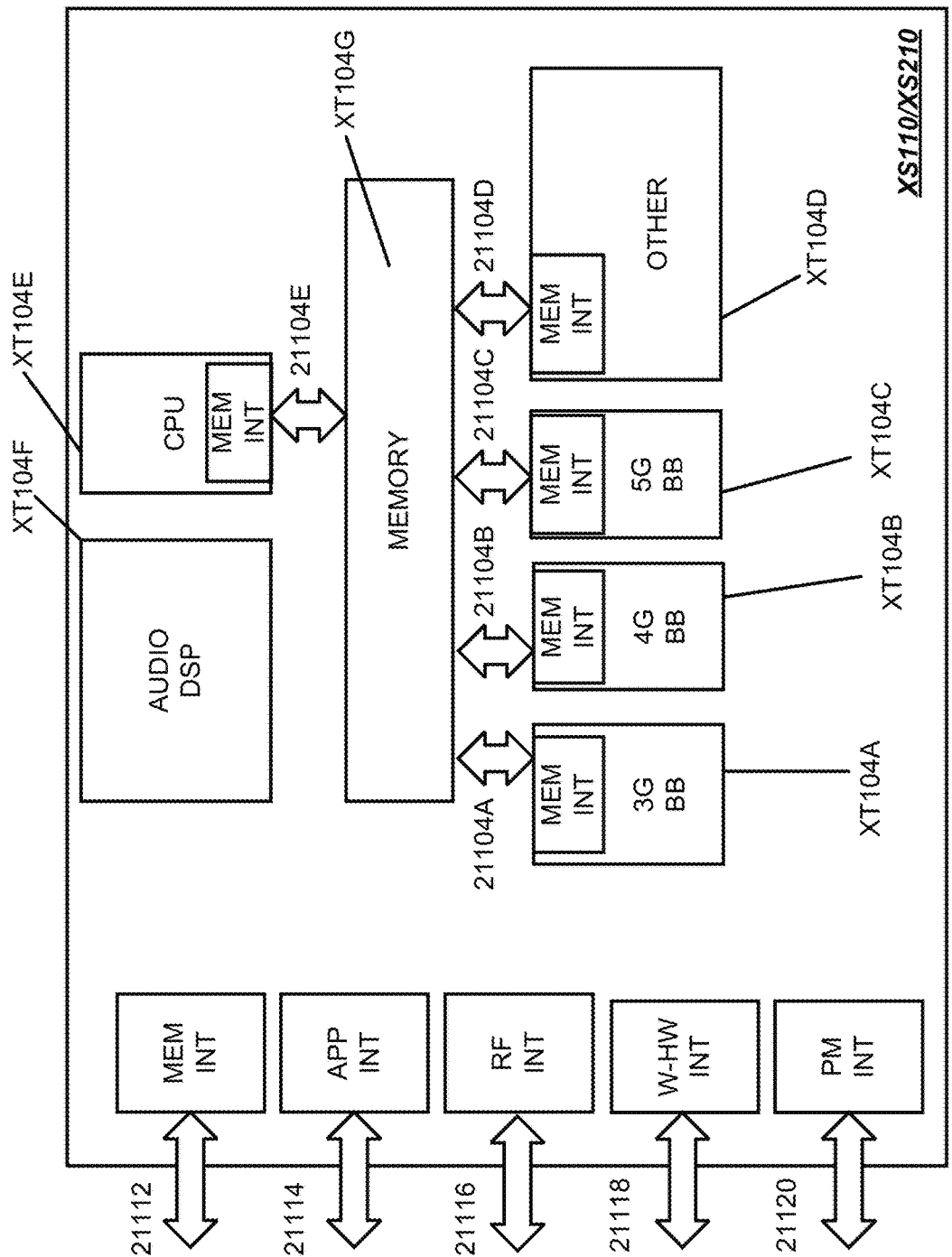
FIG. 21 illustrates example interfaces of baseband circuitry in accordance with various embodiments.

FIG. 21 illustrates example interfaces of baseband circuitry in accordance with various embodiments. As discussed above, the baseband circuitry 1810/1910 of FIGS. 18, 19, and 20 may comprise processors 20104A-20104E and a memory 20104G utilized by said processors. Each of the processors 20104A-20104E may include a memory interface, 21104A-21104E, respectively, to send/receive data to/from the memory 20104G.

The baseband circuitry 1810/1910 may further include one or more interfaces to communicatively couple to other circuitries/devices, such as a memory interface 21112 (e.g., an interface to send/receive data to/from memory e20ernal to the baseband circuitry 1810/1910), an application circuitry interface 21114 (e.g., an interface to send/receive data to/from the application circuitry 1805/1905 of FIGS. 18-20), an RF circuitry interface 21116 (e.g., an interface to send/receive data to/from RF circuitry 20106 of FIG. 20), a wireless hardware connectivity interface 21118 (e.g., an interface to send/receive data to/from Near Field Communication (NFC) components, Bluetooth® components (e.g., Bluetooth® Low Energy), Wi-Fi® components, and other communication components), and a power management interface 21120 (e.g., an interface to send/receive power or control signals to/from the PMIC 1925.

Figure 22:
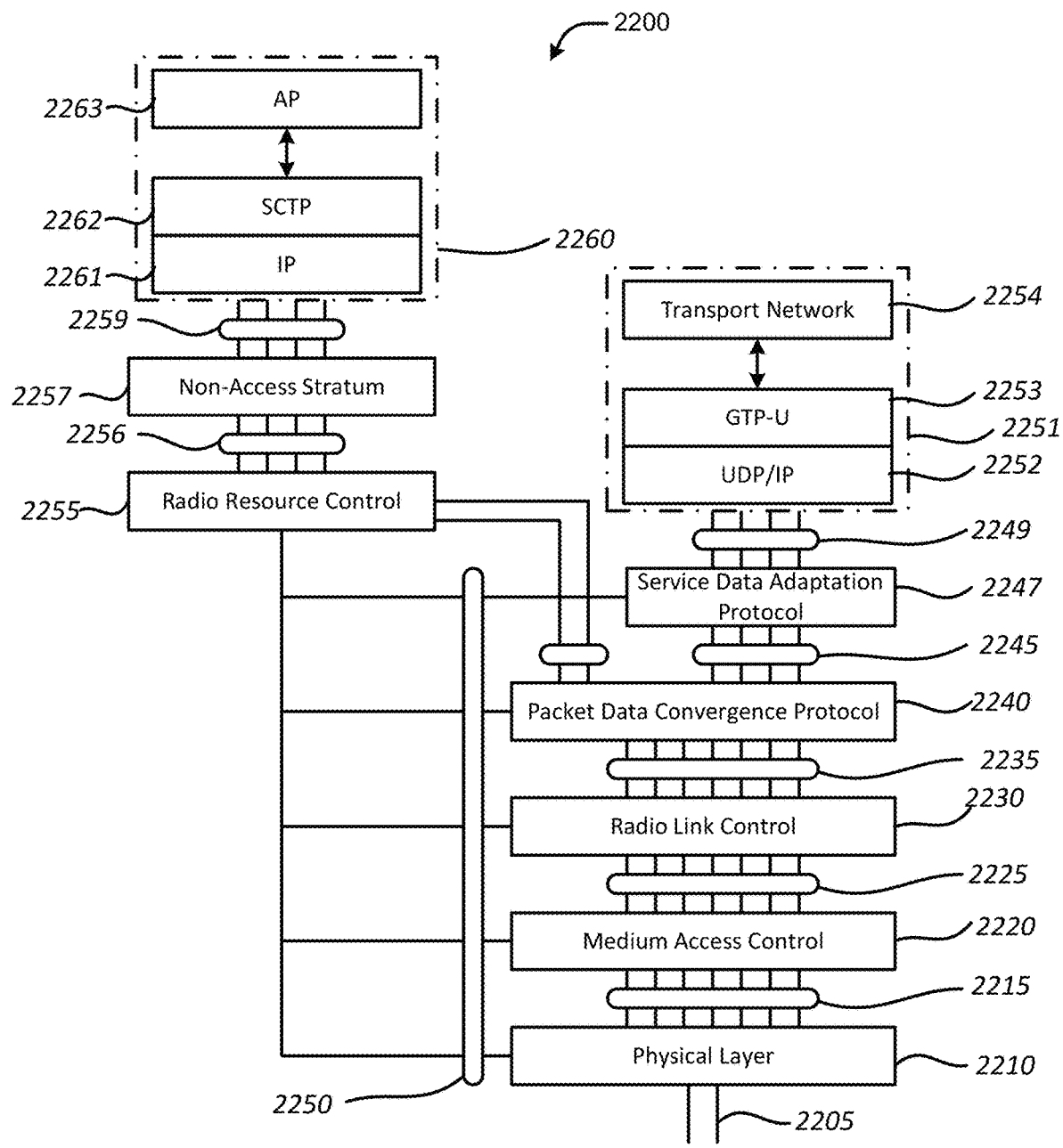
FIG. 22 illustrates various protocol functions that may be implemented in a wireless communication device according to various embodiments.

FIG. 22 illustrates various protocol functions that may be implemented in a wireless communication device according to various embodiments. In particular, FIG. 22 includes an arrangement 2200 showing interconnections between various protocol layers/entities. The following description of FIG. 22 is provided for various protocol layers/entities that operate in conjunction with the Fifth Generation (5G) or New Radio (NR) system standards and LTE system standards, but some or all of the aspects of FIG. 22 may be applicable to other wireless communication network systems as well.

The protocol layers of arrangement 2200 may include one or more of a physical layer (PHY) 2210, a medium access control layer (MAC) 2220, a radio link control layer (RLC) 2230, a packet data convergence protocol layer (PDCP) 2240, a service data adaptation protocol layer (SDAP) 2247, a radio resource control layer (RRC) 2255, and a non access stratum (NAS) layer 2257, in addition to other higher layer functions not illustrated. The protocol layers may include one or more service access points (e.g., items 2259, 2256, 2250, 2249, 2245, 2235, 2225, and 2215 in FIG. 22) that may provide communication between two or more protocol layers.

The PHY 2210 may transmit and receive physical layer signals 2205 that may be received from or transmitted to one or more other communication devices. The physical layer signals 2205 may comprise one or more physical channels, such as those discussed herein. The PHY 2210 may further perform link adaptation or adaptive modulation and coding (AMC), power control, cell search (e.g., for initial synchronization and handover purposes), and other measurements used by higher layers, such as the RRC 2255. The PHY 2210 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing. In embodiments, an instance of PHY 2210 may process requests from and provide indications to an instance of MAC 2220 via one or more physical layer service access points (PHY-SAP) 2215. According to some embodiments, requests and indications communicated via PHY-SAP 2215 may comprise one or more transport channels.

Instance(s) of MAC 2220 may process requests from, and provide indications to an instance of RLC 2230 via one or more medium access control service access points (MAC-SAP) 2225. These requests and indications communicated via the MAC-SAP 2225 may comprise one or more logical channels. The MAC 2220 may perform mapping between the logical channels and transport channels, multiplexing of MAC SDUs from one or more logical channels onto transport blocks (TB) to be delivered to PHY 2210 via the transport channels, de-multiplexing MAC SDUs to one or more logical channels from TBs delivered from the PHY 2210 via transport channels, multiplexing MAC SDUs onto TBs, scheduling information reporting, error correction through hybrid automatic repeat request (HARQ), and logical channel prioritization.

Instance(s) of RLC 2230 may process requests from and provide indications to an instance of PDCP 2240 via one or more radio link control service access points (RLC-SAP) 2235. These requests and indications communicated via RLC-SAP 2235 may comprise one or more RLC channels. The RLC 2230 may operate in a plurality of modes of operation, including: Transparent Mode™, Unacknowledged Mode (UM), and Acknowledged Mode (AM). The RLC 2230 may execute transfer of upper layer protocol data units (PDUs), error correction through automatic repeat request (ARQ) for AM data transfers, and concatenation, segmentation and reassembly of RLC SDUs for UM and AM data transfers. The RLC 2230 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 2240 may process requests from and provide indications to instance(s) of RRC 2255 and/or instance(s) of SDAP 2247 via one or more packet data convergence protocol service access points (PDCP-SAP) 2245. These requests and indications communicated via PDCP-SAP 2245 may comprise one or more radio bearers. The PDCP layer 2204 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 2247 may process requests from and provide indications to one or more higher layer protocol entities via one or more service data adaptation protocol service access points (SDAP-SAP) 2249. These requests and indications communicated via SDAP-SAP 2249 may comprise one or more quality of service (QoS) flows. The SDAP 2247 may map QoS flows to data radio bearers (DRBs), and vice versa, and may also mark QoS flow IDs (QFIs) in DL and UL packets. A single SDAP entity 2247 may be configured for an individual PDU session. In the UL direction, the NG-RAN 120 may control the mapping of QoS Flows to DRB(s) in two different ways, reflective mapping or explicit mapping. For reflective mapping, the SDAP 2247 of a UE 101 may monitor the QoS flow ID(s) of the DL packets for each DRB, and may apply the same mapping for packets flowing in the UL direction. For a DRB, the SDAP 2247 of the UE 101 may map the UL packets belonging to the QoS flows(s) corresponding to the QoS flow ID(s) and PDU Session observed in the DL packets for that DRB. To enable reflective mapping, the NG-RAN 1710 may mark DL packets over the Uu interface with a QoS flow ID. The explicit mapping may involve the RRC 2255 configuring the SDAP 2247 with an explicit QoS flow to DRB mapping rule, which may be stored and followed by the SDAP 2247. In embodiments, the SDAP 2247 may only be used in NR implementations and may not be used in LTE implementations.

The RRC 2255 may configure, via one or more management service access points (M-SAP), aspects of one or more protocol layers, which may include one or more instances of PHY 2210, MAC 2220, RLC 2230, PDCP 2240 and SDAP 2247. In embodiments, an instance of RRC 2255 may process requests from and provide indications to one or more NAS entities 2257 via one or more RRC service access points (RRC-SAP) 2256. The main services and functions of the RRC 2255 may include broadcast of system information (e.g., included in Master Information Blocks (MIBs) or System Information Blocks (SIBs) related to the NAS), broadcast of system information related to the access stratum (AS), paging, establishment, maintenance and release of an RRC connection between the UE 101 and RAN 120 (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. The MIBs and SIBs may comprise one or more information elements (IEs), which may each comprise individual data fields or data structures.

The NAS 2257 may form the highest stratum of the control plane between the UE 101 and the AMF 1721. The NAS 2257 may support the mobility of the UEs 101 and the session management procedures to establish and maintain IP connectivity between the UE 101 and a P-GW in LTE systems.

According to various embodiments, one or more protocol entities of arrangement 2200 may be implemented in UEs 101, RAN nodes 1111, AMF 1721 in NR implementations or MME 1621 in LTE implementations, UPF 1702 in NR implementations or S-GW 1622 and P-GW 1623 in LTE implementations, or the like to be used for control plane or user plane communications protocol stack between the aforementioned devices. In such embodiments, one or more protocol entities that may be implemented in one or more of UE 101, gNB 111, AMF 1721, etc. may communicate with a respective peer protocol entity that may be implemented in or on another device using the services of respective lower layer protocol entities to perform such communication. In some embodiments, a gNB-central unit (gNB-CU) of the gNB 111 may host the RRC 2255, SDAP 2247, and PDCP 2240 of the gNB that controls the operation of one or more gNB-distributed units (DUs), and the gNB-DUs of the gNB 111 may each host the RLC 2230, MAC 2220, and PHY 2210 of the gNB 111.

In a first example, a control plane protocol stack may comprise, in order from highest layer to lowest layer, NAS 2257, RRC 2255, PDCP 2240, RLC 2230, MAC 2220, and PHY 2210. In this example, upper layers 2260 may be built on top of the NAS 2257, which includes an internet protocol layer (IP) 2261, an Stream Control Transmission Protocol layer (SCTP) 2262, and an application layer signaling protocol (AP) 2263.

In NR implementations, the AP 2263 may be an NG application protocol layer (NGAP or NG-AP) 2263 for the NG interface 113 defined between the NG-RAN node 111 and the AMF 1721, or the AP 2263 may be an Xn application protocol layer (XnAP or Xn-AP) 2263 for the Xn interface 112 that is defined between two or more RAN nodes 111.

The NG-AP 2263 may support the functions of the NG interface 113 and may comprise Elementary Procedures (EPs). An NG-AP EP may be a unit of interaction between the NG-RAN node 111 and the AMF 1721. The NG-AP 2263 services may comprise two groups: UE-associated services (e.g., services related to a UE 101, 102) and non-UE-associated services (e.g., services related to the whole NG interface instance between the NG-RAN node 111 and AMF 1721). These services may include functions including, but not limited to: a paging function for the sending of paging requests to NG-RAN nodes 111 involved in a particular paging area; UE Context management function for allowing the AMF 1721 to establish, modify, and/or release a UE Context in the AMF 1721 and the NG-RAN node 111; mobility function for UEs 101 in ECM-CONNECTED mode for intra-system HOs to support mobility within NG-RAN and inter-system HOs to support mobility from/to EPS systems; NAS Signaling Transport function for transporting or rerouting NAS messages between UE 101 and AMF 1721; a NAS node selection function for determining an association between the AMF 1721 and the UE 101; NG interface management function(s) for setting up the NG interface and monitoring for errors over the NG interface; warning message transmission function provides means to transfer warning messages via NG interface or cancel ongoing broadcast of warning messages; Configuration Transfer function for requesting and transferring of RAN configuration information (e.g., Self-Organizing Network (SON) information, performance measurement (PM) data, etc.) between two RAN nodes 111 via CN 120; and/or other like functions.

The XnAP 2263 may support the functions of the Xn interface 112 and may comprise XnAP basic mobility procedures and XnAP global procedures. The XnAP basic mobility procedures may comprise procedures used to handle UE mobility within the NG RAN 120 (or E-UTRAN 120), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 2263 may be an S1 Application Protocol layer (S1-AP) 2263 for the S1 interface 113 defined between an E-UTRAN node 111 and an MME, or the AP 2263 may be an X2 application protocol layer (X2AP or X2-AP) 2263 for the X2 interface 112 that is defined between two or more E-UTRAN nodes 111.

The S1 Application Protocol layer (S1-AP) 2263 may support the functions of the S1 interface, and similar to the NG-AP discussed previously, the S1-AP may comprise S1-AP EPs. An S1-AP EP may be a unit of interaction between the E-UTRAN node 111 and an MME 1621 within an LTE CN 120. The S1-AP 2263 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 2263 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 2262 may provide guaranteed delivery of application layer messages (e.g., NGAP or XnAP messages in NR implementations, or S1-AP or X2AP messages in LTE implementations). The SCTP 2262 may ensure reliable delivery of signaling messages between the RAN node 111 and the AMF 1721/MME 1621 based, in part, on the IP protocol, supported by the IP 2261. The Internet Protocol layer (IP) 2261 may be used to perform packet addressing and routing functionality. In some implementations the IP layer 2261 may use point-to-point transmission to deliver convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 2247, PDCP 2240, RLC 2230, MAC 2220, and PHY 2210. The user plane protocol stack may be used for communication between the UE 101, the RAN node 111, and UPF 1702 in NR implementations or an S-GW ZR122 and P-GW 1623 in LTE implementations. In this example, upper layers 2251 may be built on top of the SDAP 2247, and may include a user datagram protocol (UDP) and IP security layer (UDP/IP) 2252, a General Packet Radio Service (GPRS) Tunneling Protocol for the user plane layer (GTP-U) 2253, and a User Plane Protocol Data Unit layer (UP PDU) 2263.

The transport network layer 2254 (also referred to as a "transport layer") may be built on IP transport, and the GTP-U 2253 may be used on top of the UDP/IP layer 1703 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 2253 may be used for carrying user data within the GPRS core network and between the radio access network and the core network. The user data transported can be packets in any of IPv4, IPv6, or PPP formats, for example. The UDP/IP 2252 may provide checksums for data integrity, port numbers for addressing different functions at the source and destination, and encryption and authentication on the selected data flows. The RAN node 111 and the S-GW 1622 may utilize an S1-U interface to exchange user plane data via a protocol stack comprising an L1 layer (e.g., PHY 2210), an L2 layer (e.g., MAC 2220, RLC 2230, PDCP 2240, and/or SDAP 2240), the UDP/IP layer 2252, and the GTP-U 2253. The S-GW 1622 and the P-GW 1623 may utilize an S5/S8a interface to exchange user plane data via a protocol stack comprising an L1 layer, an L2 layer, the UDP/IP layer 2252, and the GTP-U 2253. As discussed previously, NAS protocols may support the mobility of the UE 101 and the session management procedures to establish and maintain IP connectivity between the UE 101 and the P-GW 1623.

Moreover, although not shown by FIG. 22, an application layer may be present above the AP 2263 and/or the transport network layer 2254. The application layer may be a layer in which a user of the UE 101, RAN node 111, or other network element interacts with software applications being executed, for example, by application circuitry 1805 or application circuitry 1905, respectively. The application layer may also provide one or more interfaces for software applications to interact with communications systems of the UE 101 or RAN node 111, such as the baseband circuitry 1810/1910. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 23:
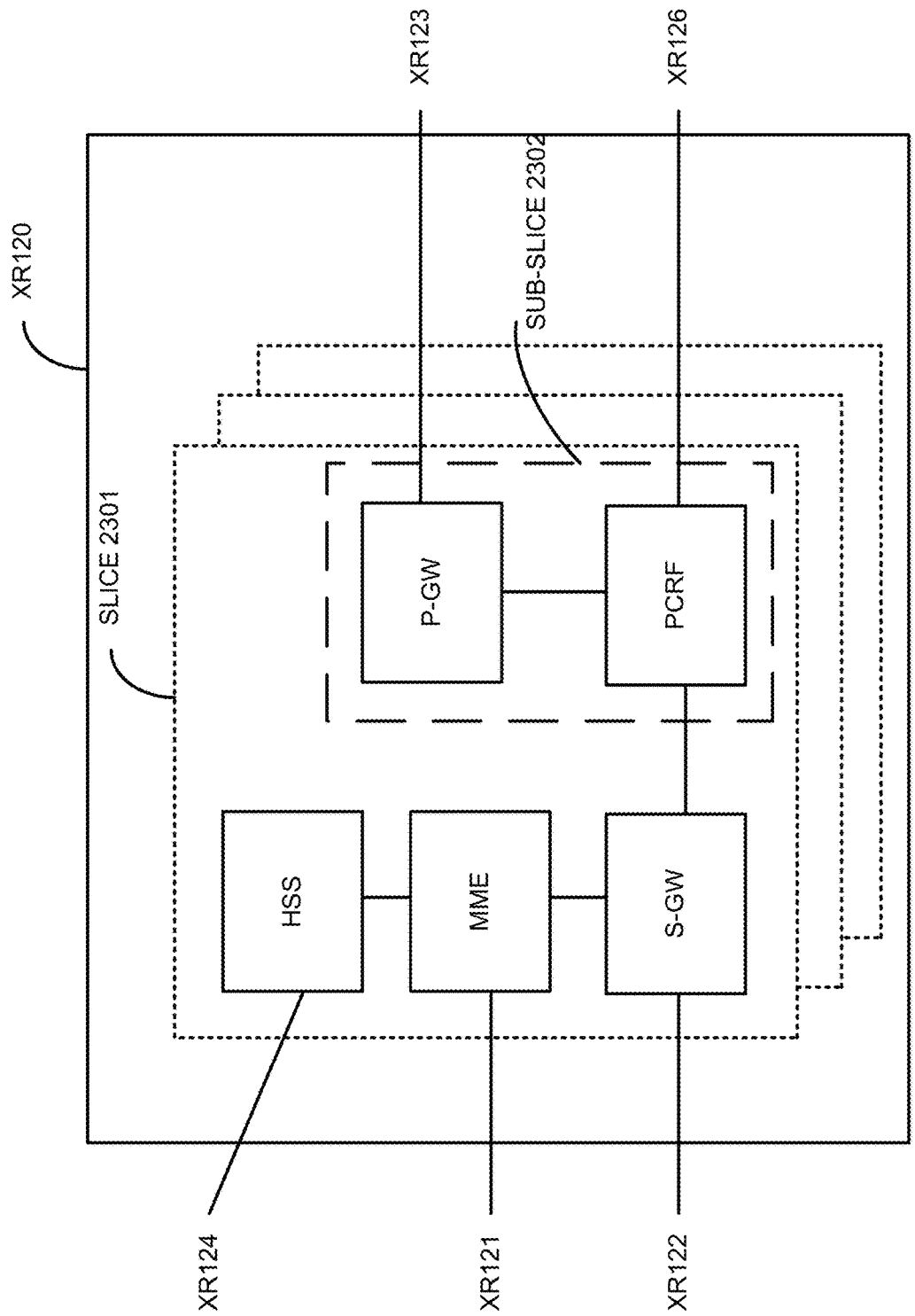
FIG. 23 illustrates components of a core network in accordance with various embodiments.

FIG. 23 illustrates components of a core network in accordance with various embodiments. The components of the CN 1620 may be implemented in one physical node or separate physical nodes including components to read and execute instructions from a machine-readable or computer-readable medium (e.g., a non-transitory machine-readable storage medium). In embodiments, the components of CN 1720 may be implemented in a same or similar manner as discussed herein with regard to the components of CN 1620. In some embodiments, Network Functions Virtualization (NFV) is utilized to virtualize any or all of the above described network node functions via executable instructions stored in one or more computer readable storage mediums (described in further detail below). A logical instantiation of the CN 1620 may be referred to as a network slice 2301, and individual logical instantiations of the CN 1620 may provide specific network capabilities and network characteristics. A logical instantiation of a portion of the CN 1620 may be referred to as a network sub-slice 2302 (e.g., the network sub-slice 2302 is shown to include the PGW 1623 and the PCRF 1626).

As used herein, the terms "instantiate", "instantiation", and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to set of network functions (NFs) instances and the resources (e.g., compute, storage, and networking resources) required to deploy the network slice.

With respect to 5G systems (see e.g., FIG. 17), a network slice may include the CN control plane and user plane NFs, NG RANs in a serving PLMN, and a N3IWF functions in the serving PLMN. Individual network slices may have different Single Network Slice Selection Assistance Information (S-NSSAI) and/or may have different Slice/Service Types (SSTs). Network slices may differ for supported features and network functions optimizations, and/or multiple network slice instances may deliver the same service/features but for different groups of UEs (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G access node (AN) and associated with eight different S-NSSAIs. Moreover, an AMF instance serving an individual UE may belong to each of the network slice instances serving that UE.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 24:
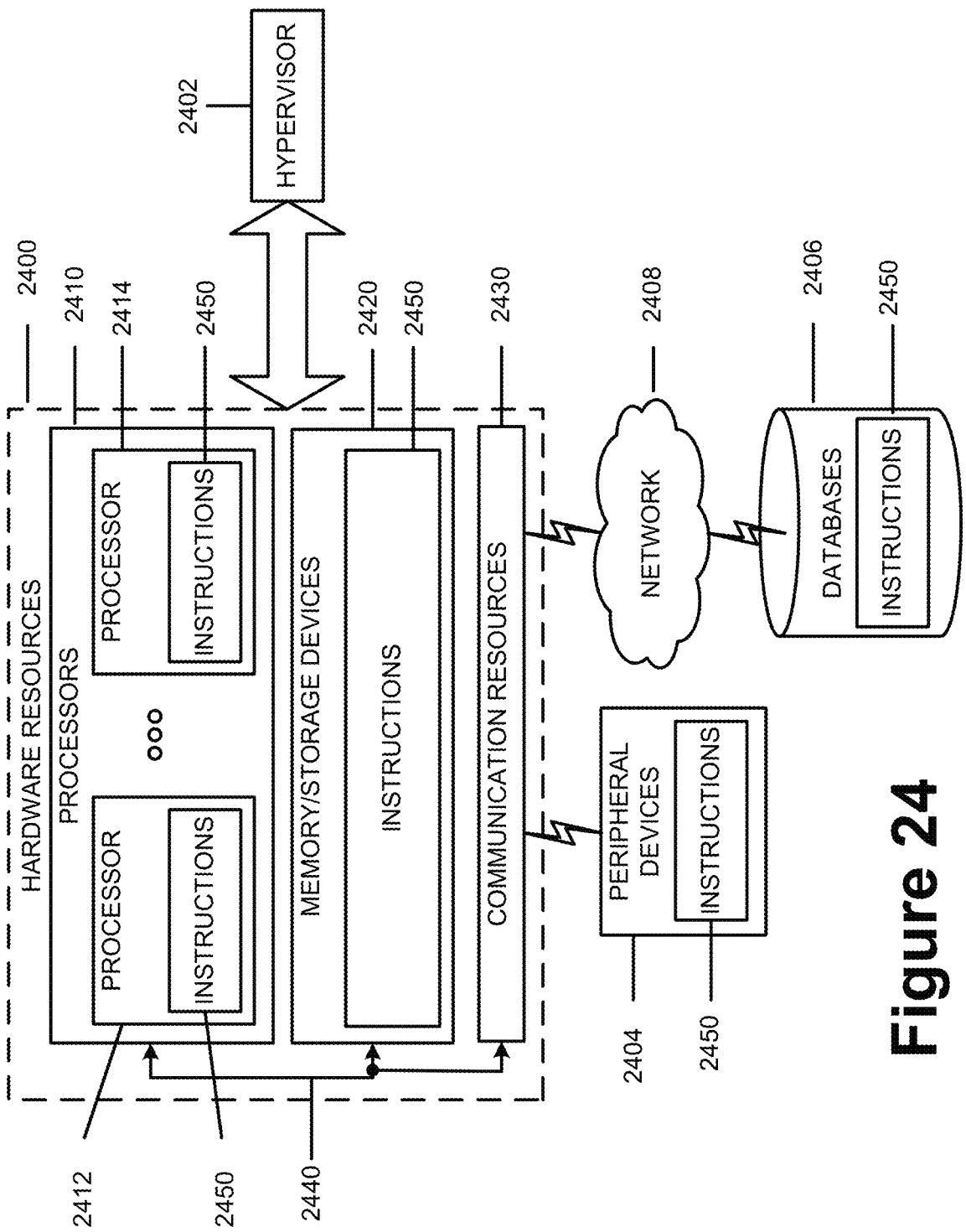
FIG. 24 is a block diagram illustrating components, according to some example embodiments, able to read instructions from a machine-readable or computer-readable medium (e.g., a non-transitory machine-readable storage medium) and perform any one or more of the methodologies discussed herein.

FIG. 24 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 24 shows a diagrammatic representation of hardware resources 2400 including one or more processors (or processor cores) 2410, one or more memory/storage devices 2420, and one or more communication resources 2430, each of which may be communicatively coupled via a bus 2440. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 2402 may be executed to provide an execution environment for one or more network slices/sub-slices to utilize the hardware resources 2400. A "virtualized resource" may refer to compute, storage, and/or network resources provided by virtualization infrastructure to an application, device, system, etc.

The processors 2410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2412 and a processor 2414.

The memory/storage devices 2420 may include main memory, disk storage, or any suitable combination thereof. The memory/storage devices 2420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2430 may include interconnection or network interface components or other suitable devices to communicate with one or more peripheral devices 2404 or one or more databases 2406 via a network 2408. For example, the communication resources 2430 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 2450 may comprise software, a program, an application, an applet, an app, or other executable code for causing at least any of the processors 2410 to perform any one or more of the methodologies discussed herein. The instructions 2450 may reside, completely or partially, within at least one of the processors 2410 (e.g., within the processor's cache memory), the memory/storage devices 2420, or any suitable combination thereof. Furthermore, any portion of the instructions 2450 may be transferred to the hardware resources 2400 from any combination of the peripheral devices 2404 or the databases 2406. Accordingly, the memory of processors 2410, the memory/storage devices 2420, the peripheral devices 2404, and the databases 2406 are examples of computer-readable and machine-readable media.

In some embodiments, the electronic device(s), network(s), system(s), chip(s) or component(s), or portions or implementations thereof, of any figure herein may be configured to perform one or more processes, techniques, or methods as described herein, or portions thereof.

In embodiments where the electronic device(s), or one or more portions, implementations, or components thereof, of one or more of FIGS. 1-24 is, implements, is incorporated into, or is otherwise part of a UE, various circuitry may be to perform a network procedure in a wireless network; include a 5G vehicle-to-everything (V2X) capability in a message during the network procedure; and cause the message to be transmitted to a network entity.

In embodiments where the electronic device(s), or one or more portions, implementations, or components thereof, of one or more of FIGS. 1-24 is, implements, is incorporated into, or is otherwise part of a MME or AMF, various circuitry may be to determine 5G vehicle-to-everything (V2X) capability of a user equipment (UE) based on a message of a network procedure in a wireless network; determine if the UE is authorized to perform 5G V2X operations based on subscription information from a Home Subscriber Server (HSS); and indicate to a 5G access network (AN) the UE is authorized to perform the 5G V2X operations.

In some embodiments, the electronic device(s), network(s), system(s), chip(s) or component(s), or portions or implementations thereof, of Figures herein may be configured to perform one or more processes, techniques, or methods as described herein, or portions thereof.

EXAMPLES

Example 1 includes an apparatus comprising:
means for performing a network procedure in a wireless network;
means for including a 5G vehicle-to-everything (V2X) capability in a message during the network procedure; and
means for causing the message to be transmitted to a network entity.

Example 2 includes the apparatus of example 1 and/or some other examples herein, wherein the wireless network may be a combined 4G network and 5G network where a 5G access network (AN) is a secondary Radio Access Network (RAN) node using Evolved Packet Core (EPC), a standalone 5G network where the 5G AN is a master RAN node using 5G Core Network (5GC), or a combined 4G network and 5G network where a 5G AN is a master RAN node using 5GC.

Example 3 includes the apparatus of example 1 and/or some other examples herein, wherein the message may be a non access stratum (NAS) attach request message, a tracking area update request message, a registration request message, or a service request message.

Example 4 includes the apparatus of example 1 and/or some other examples herein, wherein the network entity is a mobility management entity (MME) or an access and mobility management function (AMF).

Example 5 includes the apparatus of example 1 and/or some other examples herein, wherein the network procedure may be an initial registration or attach procedure, a service request procedure, a tracking area update (TAU) procedure, an Xn based handover procedure, or an S1 based handover procedure.

Example 6 includes the apparatus of any of the examples 1-5 and/or some other examples herein, wherein the apparatus is implemented in or employed by a user equipment (UE).

Example 7 may include an apparatus comprising:

means for determining 5G vehicle-to-everything (V2X) capability of a user equipment (UE) based on a message of a network procedure in a wireless network;

means for determining if the UE is authorized to perform 5G V2X operations based on subscription information from a Home Subscriber Server (HSS); and means for indicating to a 5G access network (AN) the UE is authorized to perform the 5G V2X operations.

Example 8 includes the apparatus of example 7 and/or some other examples herein, wherein the wireless network may be a combined 4G network and 5G network where a 5G access network (AN) is a secondary Radio Access Network (RAN) node using Evolved Packet Core (EPC), a standalone 5G network where the 5G AN is a master RAN node using 5G Core Network (5GC), or a combined 4G network and 5G network where a 5G AN is a master RAN node using 5GC.

Example 9 includes the apparatus of example 7 and/or some other examples herein, wherein the message may be an non access stratum (NAS) attach request message, a tracking area update request message, a registration request message, or a service request message.

Example 10 includes the apparatus of example 7 and/or some other examples herein, wherein the network procedure may be an initial registration or attach procedure, a service request procedure, a tracking area update (TAU) procedure, a Xn based handover procedure, or a S1 based handover procedure.

Example 11 includes the apparatus of example 7 and/or some other examples herein, wherein the 5G vehicle-to-everything (V2X) capability includes whether the UE is capable of supporting V2X communication over PC5 reference point.

Example 12 includes the apparatus of any of the examples 7-11 and/or some other examples herein, wherein the apparatus is implemented in or employed by a mobility management entity (MME) or an access and mobility management function (AMF).

Example 13 includes an apparatus comprising:

a first circuitry to perform a network procedure in a wireless network;

a second circuitry coupled with the first circuitry, the second circuitry to include a 5G vehicle-to-everything (V2X) capability in a message during the network procedure; and a third circuitry coupled with the second circuitry, the third circuitry to cause the message to be transmitted to a network entity.

Example 14 includes the apparatus of example 13 and/or some other examples herein, wherein the wireless network may be a combined 4G network and 5G network where a 5G access network (AN) is a secondary Radio Access Network (RAN) node using Evolved Packet Core (EPC), a standalone 5G network where the 5G AN is a master RAN node using 5G Core Network (5GC), or a combined 4G network and 5G network where a 5G AN is a master RAN node using 5GC.

Example 15 includes the apparatus of example 13 and/or some other examples herein, wherein the message may be an non access stratum (NAS) attach request message, a tracking area update request message, a registration request message, or a service request message.

Example 16 includes the apparatus of example 13 and/or some other examples herein, wherein the network entity is a mobility management entity (MME) or an access and mobility management function (AMF).

Example 17 includes the apparatus of example 13 and/or some other examples herein, wherein the network procedure may be an initial registration or attach procedure, a service request procedure, a tracking area update (TAU) procedure, a Xn based handover procedure, or a S1 based handover procedure.

Example 18 includes the apparatus of any of the examples 13-17 and/or some other examples herein, wherein the apparatus is implemented in or employed by a user equipment (UE).

Example 19 includes an apparatus comprising:

a first circuitry to determine 5G vehicle-to-everything (V2X) capability of a user equipment (UE) based on a message of a network procedure in a wireless network;

a second circuitry coupled with the first circuitry, the second circuitry to determine if the UE is authorized to perform 5G V2X operations based on subscription information from a Home Subscriber Server (HSS); and a third circuitry coupled with the second circuitry, the third circuitry to indicate to a 5G access network (AN) the UE is authorized to perform the 5G V2X operations.

Example 20 includes the apparatus of example 19 and/or some other examples herein, wherein the wireless network may be a combined 4G network and 5G network where a 5G access network (AN) is a secondary Radio Access Network (RAN) node using Evolved Packet Core (EPC), a standalone 5G network where the 5G AN is a master RAN node using 5G Core Network (5GC), or a combined 4G network and 5G network where a 5G AN is a master RAN node using 5GC.

Example 21 includes the apparatus of example 19 and/or some other examples herein, wherein the message may be an non access stratum (NAS) attach request message, a tracking area update request message, a registration request message, or a service request message.

Example 22 includes the apparatus of example 19 and/or some other examples herein, wherein the network procedure may be an initial registration or attach procedure, a service request procedure, a tracking area update (TAU) procedure, a Xn based handover procedure, or a S1 based handover procedure.

Example 23 includes the apparatus of example 19 and/or some other examples herein, wherein the 5G vehicle-to-everything (V2X) capability includes whether the UE is capable of supporting V2X communication over PC5 reference point.

Example 24 includes the apparatus of any of the examples 19-23 and/or some other examples herein, wherein the method is implemented in or employed by a mobility management entity (MME) or an access and mobility management function (AMF).

Example 25 includes a method for a user equipment (UE), the method comprising:

performing or causing to perform a network procedure in a wireless network;

generating or causing to generate a message to include a 5G vehicle-to-everything (V2X) capability during the network procedure; and transmitting or causing the message to be transmitted to a network entity.

Example 26 includes the method of example 25 and/or some other examples herein, wherein the wireless network may be a combined 4G network and 5G network where a 5G access network (AN) is a secondary Radio Access Network (RAN) node using Evolved Packet Core (EPC), a standalone 5G network where the 5G AN is a master RAN node using 5G Core Network (5GC), or a combined 4G network and 5G network where a 5G AN is a master RAN node using 5GC.

Example 27 includes the method of example 25 and/or some other examples herein, wherein the message may be an non access stratum (NAS) attach request message, a tracking area update request message, a registration request message, or a service request message.

Example 28 includes the method of example 25 and/or some other examples herein, wherein the network procedure may be an initial registration or attach procedure, a service request procedure, a tracking area update (TAU) procedure, a Xn based handover procedure, or a S1 based handover procedure.

Example 29 includes the method of example 25 and/or some other examples herein, wherein the 5G vehicle-to-everything (V2X) capability includes whether the UE is capable of supporting V2X communication over PC5 reference point.

Example 30 includes the method of any of the examples 25-29 and/or some other examples herein, wherein the method is performed by a user equipment (UE).

Example 31 includes a method comprising:
determining or causing to determine 5G vehicle-to-everything (V2X) capability of a user equipment (UE) based on a message of a network procedure in a wireless network;
determining or causing to determine if the UE is authorized to perform 5G V2X operations based on subscription information from a Home Subscriber Server (HSS); and
indicating or causing to indicate, to a 5G access network (AN), that the UE is authorized to perform the 5G V2X operations.

Example 32 includes the method of example 31 and/or some other examples herein, wherein the wireless network may be a combined 4G network and 5G network where a 5G access network (AN) is a secondary Radio Access Network (RAN) node using Evolved Packet Core (EPC), a standalone 5G network where the 5G AN is a master RAN node using 5G Core Network (5GC), or a combined 4G network and 5G network where a 5G AN is a master RAN node using 5GC.

Example 33 includes the method of example 31 and/or some other examples herein, wherein the message may be an non access stratum (NAS) attach request message, a tracking area update request message, a registration request message, or a service request message.

Example 34 includes the method of example 31 and/or some other examples herein, wherein the network procedure may be an initial registration or attach procedure, a service request procedure, a tracking area update (TAU) procedure, a Xn based handover procedure, or a S1 based handover procedure.

Example 35 includes the method of example 31 and/or some other examples herein, wherein the 5G vehicle-to-everything (V2X) capability includes whether the UE is capable of supporting V2X communication over PC5 reference point.

Example 36 includes the method of any of the examples 31-35 and/or some other examples herein, wherein the method is performed by a mobility management entity (MME) or an access and mobility management function (AMF).

Example 37 may include a method, comprising: when the UE is accessing E-UTRAN or NG-RAN served by AMF, UE includes its V2X capability indicating whether UE supports V2X communication over PC5 reference point with RAT information in the NAS message (e.g. Registration Request, Service Request) to AMF.

Example 38 includes the method of example 37 and/or some other examples herein, wherein AMF stores this information for V2X operation and determines if the UE is authorized to use the 5G V2X operation based on the received subscription information received from UDM (Unified Data Management).

Example 39 includes the method of examples 37-38 and/or some other examples herein, wherein if the UE is authorized to use V2X communication over PC5 for a specific RAT, the AMF includes a "V2X services authorized" indication indicating the UE is authorized to use V2X communication over PC5, RAT information and UE-PC5-AMBR in the N2 message from AMF to E-UTRAN or NG-RAN.

Example 40 includes the method of examples 37-39 and/or some other examples herein, wherein when the UE is accessing E-UTRAN or NG-RAN served by MME, UE includes its V2X capability indicating whether UE supports V2X communication over PC5 reference point with RAT information in the NAS message (e.g. Attach Request, Service Request, TAU Request) to AMF.

Example 41 includes the method of example 40 and/or some other examples herein, wherein the AMF is to store this information for V2X operation and determines if the UE is authorized to use the 5G V2X operation based on the received subscription information received from HSS.

Example 42 includes the method of example 41 and/or some other examples herein, wherein if the UE is authorized to use V2X communication over PC5 for a specific RAT, the MME includes a "V2X services authorized" indication indicating the UE is authorized to use V2X communication over PC5, RAT information, and UE-PC5-AMBR in the N2 message from MME to 5G AN (or NG-RAN).

Example 43 includes the method of examples 37-42 and/or some other examples herein, wherein During Xn based handover procedure, the "V2X services authorized", RAT information and UE-PC5-AMBR are sent from source NG-RAN to target NG-RAN as part of UE context.

Example 44 includes the method of examples 37-43 and/or some other examples herein, wherein During S1 based handover procedure, the "V2X services authorized", RAT information and UE-PC5-AMBR are sent from MME to target E-UTRAN.

Example 45 includes the method of examples 37-44 and/or some other examples herein, wherein during N2 based handover procedure, the "V2X services authorized", RAT information and UE-PC5-AMBR are sent from AMF to target NG-RAN Example 46 includes the method of examples 37-45 and/or some other examples herein, wherein there is change on the "V2X services authorized", RAT information or UE-PC5-AMBR, the MME (from HSS) will update the change to E-UTRAN via S1-AP UE context modification procedure.

Example 47 includes the method of examples 37-45 and/or some other examples herein, wherein If there is change on the "V2X services authorized", RAT information or UE-PC5-AMBR, the AMF (from UDM) will update the change to NG-RAN via N2-AP UE context modification procedure.

Example 48 includes the method of examples 37-45 and/or some other examples herein, wherein the RAT information can be E-UTRA, NR or other new RAT.

Example 49 includes a method comprising: receiving and processing a first message from a user equipment (UE) to acquire information indicating that the UE supports vehicle to everything (V2X) communication with a radio access technology (RAT); causing storage of the information indicating that the UE supports V2X communication with an RAT in memory; receiving subscription information from a second network entity; determining, based at least in part, on the subscription information that the UE is authorized to support V2X communication with an RAT; and generating and transmitting a second message to a third network entity, the second message comprising an indication that the UE is authorized to support V2X communication with an RAT, information associated with one or more RATs, and a UE PC5 Aggregate Maximum Bit Rate (AMBR).

Example 50 includes the method of example 49 and/or some other example herein, wherein: the first network entity comprises a mobility management entity (MME); the second network entity comprises a Home Subscriber Server (HSS); and the third network entity comprises an Evolved Universal Mobile Telecommunications System Terrestrial Radio Access Network (E UTRAN).

Example 51 includes the method of example 49 and/or some other example herein, wherein: the first network entity comprises an access and mobility management function (AMF); the second network entity comprises a Home Subscriber Server (HSS); and the third network entity comprises a Next Generation Radio Access Network (NG RAN).

Example 52 may include an apparatus comprising means to perform one or more elements of a method described in or related to any of examples 1-51, or any other method or process described herein.

Example 53 may include one or more non-transitory computer-readable media comprising instructions to cause an electronic device, upon execution of the instructions by one or more processors of the electronic device, to perform one or more elements of a method described in or related to any of examples 1-51, or any other method or process described herein.

Example 54 may include an apparatus comprising logic, modules, or circuitry to perform one or more elements of a method described in or related to any of examples 1-51, or any other method or process described herein.

Example 55 may include a method, technique, or process as described in or related to any of examples 1-51, or portions or parts thereof.

Example 56 may include an apparatus comprising: one or more processors and one or more computer readable media comprising instructions that, when executed by the one or more processors, cause the one or more processors to perform the method, techniques, or process as described in or related to any of examples 1-51, or portions thereof.

Example 57 may include a signal as described in or related to any of examples 1-51, or portions or parts thereof.

Example 58 may include a signal in a wireless network as shown and described herein.

Example 59 may include a method of communicating in a wireless network as shown and described herein.

Example 60 may include a system for providing wireless communication as shown and described herein.

Example 61 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. One or more non-transitory computer-readable storage media including computer executable instructions that, when executed by one or more processors, cause a mobility management entity (MME) to:
receive and process a first message from a user equipment (UE) to acquire information indicating that the UE supports vehicle-to-everything (V2X) communication, wherein the first message indicates a request to attach the UE to the MME for V2X communication via a radio access technology (RAT);
store the information indicating that the UE supports the V2X communication in memory;
receive subscription information from a first network entity;
determine, based at least in part on the subscription information, whether the UE is authorized to use V2X communication over a device-to-device (D2D) sidelink PC5 reference point, and whether the RAT is authorized to be used for V2X communication over the D2D sidelink PC5 reference point;
terminate, when the UE is not authorized to use V2X communication over the D2D sidelink PC5 reference point or the RAT is not authorized to be used for V2X communication, the request to attach the UE to the MME for V2X communication; and
transmit, when the UE is authorized to use V2X communication over the D2D sidelink PC5 reference point and the RAT is authorized to be used for V2X communication, a second message to a second network entity, the second message to include an indication that the UE is authorized to use V2X communication over the D2D sidelink PC5 reference point, information associated with the authorized RAT, and a UE-PC5-Aggregate Maximum Bit Rate (AMBR).

2. The one or more non-transitory computer-readable storage media of claim 1, wherein the computer executable instructions, when executed by the one or more processors, further cause the MME to:
determine that the indication that the UE is authorized to use V2X communication over the D2D sidelink PC5 reference point, the information associated with the authorized RAT, or the UE-PC5-AMBR is to be changed based, at least in part, on a change to the subscription information; and
notify the second network entity, via a third message, of an updated indication that the UE is authorized to use V2X communication over the D2D sidelink PC5 reference point, an updated information associated with the authorized RAT, or an updated UE-PC5-AMBR.

3. The one or more non-transitory computer-readable storage media of claim 1, wherein the first network entity comprises a Home Subscriber Server (HSS), and
wherein the second network entity comprises an Evolved Universal Mobile Telecommunications System Terrestrial Radio Access Network (E-UTRAN).

4. The one or more non-transitory computer-readable storage media of claim 1, wherein the first message comprises a non-access stratum (NAS) message, and
wherein the second message comprises an S1 Application Protocol (S1AP) Initial Context Setup Request.

5. The one or more non-transitory computer-readable storage media of claim 1, wherein the computer executable instructions, when executed by the one or more processors, further cause the MME to:
perform the receive and the process, the store, the receive, the determine, the terminate, and the transmit during or as part of an initial registration or attach procedure, a service request procedure, a tracking area update (TAU) procedure, a Xn-based handover procedure, or an S1-based handover procedure.

6. The one or more non-transitory computer-readable storage media of claim 1,
wherein the UE-PC5-AMBR assists with resource management of a PC5 transmission of the UE in the V2X communication.

7. One or more non-transitory computer-readable storage media including computer executable instructions that, when executed by one or more processors, cause an access and mobility management function (AMF) to:
receive and process a first message from a user equipment (UE) to acquire information indicating that the UE supports vehicle-to-everything (V2X) communication, wherein the first message indicates a request to attach the UE to the AMF for V2X communication via a radio access technology (RAT);
store the information indicating that the UE supports the V2X communication in memory;
receive subscription information from a first network entity;
determine, based at least in part on the subscription information, whether the UE is authorized to use V2X communication over a device-to-device (D2D) sidelink PC5 reference point, and whether the RAT is authorized to be used for V2X communication over the D2D sidelink PC5 reference point;
terminate, when the UE is not authorized to use V2X communication over the D2D sidelink PC5 reference point or the RAT is not authorized to be used for V2X communication, the request to attach the UE to the AMF for V2X communication; and
transmit, when the UE is authorized to use V2X communication over the D2D sidelink PC5 reference point and the RAT is authorized to be used for V2X communication, a second message to a second network entity, the second message comprising an indication that the UE is authorized to use V2X communication over the D2D sidelink PC5 reference point, information associated with the authorized RAT, and a UE-PC5-Aggregate Maximum Bit Rate (AMBR).

8. The one or more non-transitory computer-readable storage media of claim 7, wherein the computer executable instructions, when executed by the one or more processors, further cause the AMF to:
determine that the indication that the UE is authorized to use V2X communication over the D2D sidelink PC5 reference point, the information associated with the authorized RAT, or the UE-PC5-AMBR is to be changed based, at least in part, on a change to the subscription information; and
notify the second network entity, via a third message, of an updated indication that the UE is authorized to use V2X communication over the D2D sidelink PC5 reference point, an updated information associated with the authorized RAT, or an updated UE-PC5-AMBR.

9. The one or more non-transitory computer-readable storage media of claim 7, wherein the first network entity comprises a Unified Data Management (UDM), and
wherein the second network entity comprises a Next Generation Radio Access Network (NG RAN).

10. The one or more non-transitory computer-readable storage media of claim 7, wherein the first message comprises a Registration Request message, and
wherein the second message comprises an N2 message.

11. The one or more non-transitory computer-readable storage media of claim 7, wherein the computer executable instructions, when executed by the one or more processors, further cause the AMF to:
perform the receive and the process, the store, the receive, the determine, the terminate, and the transmit as part of or during an initial registration or attach procedure, a service request procedure, a tracking area update (TAU) procedure, a Xn based handover procedure, or an S1-based handover procedure.

12. The one or more non-transitory computer-readable storage media of claim 7,
wherein the UE-PC5-AMBR assists with resource management of a PC5 transmission of the UE in the V2X communication.

13. An apparatus to implement a mobility management entity (MME), the apparatus comprising:
interface circuitry to transmit and receive messages and
processing circuitry, coupled with the interface circuitry, to:
receive, via the interface circuitry, and process a first message from a user equipment (UE) to acquire information indicating that the UE supports vehicle-to-everything (V2X) communication, wherein the first message indicates a request to attach the UE to the MME for V2X communication via a radio access technology (RAT);
store the information indicating that the UE supports the V2X communication in memory;
receive, via the interface circuitry, subscription information from a first network entity;
determine, based at least in part on the subscription information, whether the UE is authorized to use V2X communication over a device-to-device (D2D) sidelink PC5 reference point, and whether the RAT is authorized to be used for V2X communication over the D2D sidelink PC5 reference point;
terminate, when the UE is not authorized to use V2X communication over the D2D sidelink PC5 reference point or the RAT is not authorized to be used for V2X communication, the request to attach the UE to the MME for V2X communication; and
generate and transmit, via the interface circuitry, when the UE is authorized to use V2X communication over the D2D sidelink PC5 reference point and the RAT is authorized to be used for V2X communication, a second message to a second network entity, the second message comprising an indication that the UE is authorized to use V2X communication over the D2D sidelink PC5 reference point, information associated with the authorized RAT, and a UE-PC5-Aggregate Maximum Bit Rate (AMBR).

14. The apparatus of claim 13, wherein the processing circuitry is further to:
determine that the indication that the UE is authorized to use V2X communication over the D2D sidelink PC5 reference point, the information associated with the authorized RAT, or the UE-PC5-AMBR is to be changed based, at least in part, on a change to the subscription information; and
notify the second network entity, via a third message, of an updated indication that the UE is authorized to use V2X communication over the D2D sidelink PC5 reference point, an updated information associated with the authorized RAT, or an updated UE-PC5-AMBR.

15. The apparatus of claim 13, wherein the first network entity comprises a Home Subscriber Server (HSS), and wherein the second network entity comprises an Evolved Universal Mobile Telecommunications System Terrestrial Radio Access Network (E-UTRAN).

16. The apparatus of claim 13, wherein the first message comprises a non access stratum (NAS) message, and
wherein the second message comprises an S1 Application Protocol (S1AP) Initial Context Setup Request.

17. The apparatus of claim 13, wherein the processing circuitry is further to:
perform the receive and the process, the store, the receive, the determine, the terminate, and the transmit as part of or during an initial registration or attach procedure, a service request procedure, a tracking area update (TAU) procedure, a Xn based handover procedure, or an S1-based handover procedure.

18. The apparatus of claim 13,
wherein the UE-PC5-AMBR assists with resource management of a PC5 transmission of the UE in the V2X communication.

19. An apparatus to implement an Access and Mobility Management Function (AMF), the apparatus comprising:
interface circuitry to transmit and receive messages; and
processing circuitry, coupled with the interface circuitry, to:
receive, via the interface circuitry, and process a first message from a user equipment (UE) to acquire information indicating that the UE supports vehicle-to-everything (V2X) communication, wherein the first message indicates a request to attach the UE to the AMF for V2X communication via a radio access technology (RAT);
store the information indicating that the UE supports the V2X communication in memory;
receive subscription information from a first network entity;
determine, based at least in part on the subscription information, whether the UE is authorized to use V2X communication over a device-to-device (D2D) sidelink PC5 reference point, and whether the RAT is authorized to be used for V2X communication over the D2D sidelink PC5 reference point;
terminate, when the UE is not authorized to use V2X communication over the D2D sidelink PC5 reference point or the RAT is not authorized to be used for V2X communication, the request to attach the UE to the AMF for V2X communication; and
transmit, when the UE is authorized to use V2X communication over the D2D sidelink PC5 reference point and the RAT is authorized to be used for V2X communication, a second message to a second network entity, the second message comprising an indication that the UE is authorized to use V2X communication over the D2D sidelink PC5 reference point, information associated with the authorized RAT, and a UE-PC5-Aggregate Maximum Bit Rate (AMBR).

20. The apparatus of claim 19, wherein the processing circuitry is further to:
determine that the indication that the UE is authorized to use V2X communication over the D2D sidelink PC5 reference point, the information associated with the authorized RAT, or the UE-PC5-AMBR is to be changed based, at least in part, on a change to the subscription information; and
notify the second network entity, via a third message, of an updated indication that the UE is authorized to use V2X communication over the D2D sidelink PC5 reference point, an updated information associated with the authorized RAT, or an updated UE-PC5-AMBR.

21. The apparatus of claim 19, wherein the first network entity comprises a Unified Data Management (UDM), and
wherein the second network entity comprises a Next Generation Radio Access Network (NG RAN).

22. The apparatus of claim 19, wherein the first message comprises a Registration Request message, and
wherein the second message comprises an N2 message.

23. The apparatus of claim 19, wherein the processing circuitry is further to: perform the receive and the process, the store, the receive, the determine, the terminate, and the transmit as part of or during an initial registration or attach procedure, a service request procedure, a tracking area update (TAU) procedure, a Xn based handover procedure, or an S1-based handover procedure.

24. The apparatus of claim 19, wherein the UE-PC5-AMBR assists with resource management of the UE's PC5 transmission in the V2X communication.

* * * * *